United States Patent
Cahill et al.

(10) Patent No.: US 7,751,622 B2
(45) Date of Patent: Jul. 6, 2010

(54) METHOD AND SYSTEM FOR DETECTION OF UNDESIRABLE IMAGES

(75) Inventors: Nathan D. Cahill, West Henrietta, NY (US); Shoupu Chen, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 896 days.

(21) Appl. No.: 11/208,567

(22) Filed: Aug. 22, 2005

(65) Prior Publication Data
US 2007/0053557 A1 Mar. 8, 2007

(51) Int. Cl.
G06K 9/00 (2006.01)
(52) U.S. Cl. .......................... 382/181; 382/169; 358/169
(58) Field of Classification Search ................. 382/181, 382/128, 305, 169, 173, 162; 348/76; 358/527; 715/720
See application file for complete search history.

(56) References Cited

U.S. PATENT DOCUMENTS

| | | | | |
|---|---|---|---|---|
| 5,598,226 A * | 1/1997 | Kokaram | ..................... | 348/607 |
| 5,604,531 A | 2/1997 | Iddan et al. | | |
| 5,793,886 A * | 8/1998 | Cok | ........................ | 382/169 |
| 5,822,453 A | 10/1998 | Lee et al. | | |
| 5,864,411 A * | 1/1999 | Norris | ........................ | 358/527 |
| 6,535,636 B1 | 3/2003 | Savakis et al. | | |
| 6,584,223 B1 * | 6/2003 | Shiiyama | ..................... | 382/173 |
| 6,640,009 B2 * | 10/2003 | Zlotnick | ..................... | 382/224 |
| 6,690,822 B1 | 2/2004 | Chen et al. | | |
| 7,127,127 B2 * | 10/2006 | Jojic et al. | ................... | 382/305 |
| 7,152,209 B2 * | 12/2006 | Jojic et al. | ................... | 715/720 |
| 7,319,781 B2 * | 1/2008 | Chen et al. | ................... | 382/128 |
| 7,558,435 B2 * | 7/2009 | Okada et al. | ................ | 382/266 |
| 2004/0120606 A1 * | 6/2004 | Fredlund | ..................... | 382/305 |
| 2004/0175058 A1 * | 9/2004 | Jojic et al. | ................... | 382/305 |
| 2004/0208365 A1 * | 10/2004 | Loui et al. | .................. | 382/171 |

OTHER PUBLICATIONS

Textbook: R.W.G. Hunt, "The Reproduction of Color," 5th Edition, Fountain Press, 1995.
Textbook: Duda et al., "Pattern Classification," 2nd Edition, John Wiley & Sons, 2001.

* cited by examiner

Primary Examiner—Daniel G Mariam
Assistant Examiner—Aklilu k Woldemariam

(57) ABSTRACT

A method for detecting undesirable images within an image sequence, comprising the steps of receiving the image sequence; computing one or more associated image characteristics for a group of images, wherein the group of images includes at least one image from the image sequence; identifying any undesirable group of images based on the computed image characteristics; collecting undesirable groups of images into at least one collection; receiving a threshold value of a minimum number of undesirable images; and flagging as undesirable only images that belong to one or more collections that have at least the threshold value of undesirable images.

20 Claims, 18 Drawing Sheets

METHOD AND SYSTEM FOR DETECTION OF UNDESIRABLE IMAGES

FIELD OF THE INVENTION

The invention relates generally to image sequences, and in particular to the detection of undesirable images within an image sequence.

BACKGROUND OF THE INVENTION

Several in vivo measurement systems are known in the art. They include swallowable electronic capsules which collect data and which transmit the data to a receiver system. These intestinal capsules, which are moved through the digestive system by the action of peristalsis, are used to measure pH ("Heidelberg" capsules), temperature ("CoreTemp" capsules) and pressure throughout the gastro-intestinal (GI) tract. They have also been used to measure gastric residence time, which is the time it takes for food to pass through the stomach and intestines. These intestinal capsules typically include a measuring system and a transmission system, where a transmitter transmits the measured data at radio frequencies to a receiver system.

U.S. Pat. No. 5,604,531, assigned to the State of Israel, Ministry of Defense, Armament Development Authority, and incorporated herein by reference, teaches an in vivo measurement system, in particular an in vivo camera system, which is carried by a swallowable capsule. In addition to the camera system there is an optical system for imaging an area of the GI tract onto the imager and a transmitter for transmitting the video output of the camera system. The overall system, including a capsule that can pass through the entire digestive tract, operates as an autonomous video endoscope. It also images the difficult to reach areas of the small intestine.

FIG. 1 (prior art) shows a block diagram of the in vivo video camera system described in U.S. Pat. No. 5,604,531. The system captures and transmits images of the GI tract while passing through the gastro-intestinal lumen. The system contains a storage unit 100, a data processor 102, a camera 104, an image transmitter 106, an image receiver 108, which usually includes an antenna array, and an image monitor 110. Storage unit 100, data processor 102, image monitor 110, and image receiver 108 are located outside the patient's body. Camera 104, as it transits the GI tract, is in communication with image transmitter 106 located in capsule 112 and image receiver 108 located outside the body. Data processor 102 transfers frame data to and from storage unit 100 while analyzing the data. Processor 102 also transmits the analyzed data to image monitor 110 where a physician views it. The data can be viewed in real time or at some later date.

During a typical examination, the in vivo camera system may take anywhere from about four to eight hours or more to traverse the digestive tract. Assuming a capture rate of about 2 images per second, the total number of captured images can range from approximately 35,000 to 70,000 or more images. If these images were subsequently displayed as a video sequence at a rate of 30 frames per second, one would require 20-40 minutes of viewing time to observe the entire video. This estimate does not include the extra time needed to zoom in and/or decrease the frame rate for a more detailed examination of suspect areas. In practice, the total time required to interpret an in vivo examination can range from upwards of 20 minutes to four hours.

One frequent frustration of medical practitioners who interpret in vivo examinations is that there may be long time periods where fecal matter or partially digested food adheres to the optical dome of the capsule, rendering as useless the images captured during those time periods. This can occur if the patient does not fast for a long enough period of time prior to examination. Such a situation does not necessarily render the entire in vivo image sequence unusable, however, because matter adhering to the optical dome may eventually be removed by contact with the walls of the GI tract. In current practice, when fecal matter or partially digested food obscures portions of the image sequence, the medical practitioner must cue through the video in search of usable images. This cueing procedure can use valuable time, causing some practitioners to abandon the entire examination out of frustration. A similar cause of frustration occurs when the quality of imagery is so low in segments of the image sequence that there is no diagnostically useful information. One example of this occurrence is when the in vivo capsule is inside a body lumen such as the stomach or colon, and the illumination power is not high enough to illuminate the lumen wall, resulting in underexposed images.

Images that are unusable, whether obstructed by fecal matter, partially digested food, or due to poor image quality, are denoted as undesirable. In the context of viewing and/or interpreting image sequences, a single undesirable image or frame, or a few undesirable images or frames, may not be very frustrating, especially if the image sequence is being viewed at a rate of multiple frames per second. A problem occurs when a substantial number of undesirable images occur within some portion of the image sequence. For example, ten undesirable images in sequence may be viewed in seconds and would not likely be thought of as frustrating; but, five thousand undesirable images in sequence may require minutes to view, causing the medical practitioner to cue the sequence or abandon the examination. There is no clear-cut bright line threshold on the minimum number of undesirable images required to cause the viewer substantial frustration; in fact, this number is viewer dependent and probably varies for a single viewer depending on his/her tiredness.

Some prior art exists on automatically determining desirability of an image. Savakis and Loui, in commonly assigned U.S. Pat. No. 6,535,636, issued Mar. 18, 2003, teach a method for automatically classifying an image as undesirable based on thresholding one or more of the computed image characteristics that include sharpness, contrast, noise and exposure. While this method is adequate for classifying individual images as undesirable, it does not readily or efficiently extend to classifying groups of images, or portions of the image sequence, as undesirable. In the context of in vivo examinations, individual images belong to an image sequence. One simple and obvious way to apply the Savakis and Loui patent within this context is to detect individual images within the image sequence that are undesirable, and then determine whether or not any subsequences of undesirable images exist with at least a given minimum length. However, such a method could easily fail in circumstances where classification is difficult (i.e., where computed image characteristics exhibit values near the thresholds). In addition, such a method would tend to be inefficient because it fails to exploit interrelationships between the image characteristics of nearby images in the sequence. Therefore, there remains a need in the art for an improved method and system for automatically detecting undesirable images within an image sequence.

SUMMARY OF THE INVENTION

The present invention is directed to overcoming one or more of the problems set forth above. Briefly summarized, the present invention provides a method for detecting undesirable images within an image sequence, comprising the steps of: receiving the image sequence; computing one or more associated image characteristics for a group of images, wherein the group of images includes at least one image from the image sequence; identifying any undesirable group of images based on the computed image characteristics; collecting undesirable groups of images into at least one collection; receiving a threshold value of a minimum number of undesirable images; and flagging as undesirable only images that belong to one or more collections that have at least the threshold value of undesirable images.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
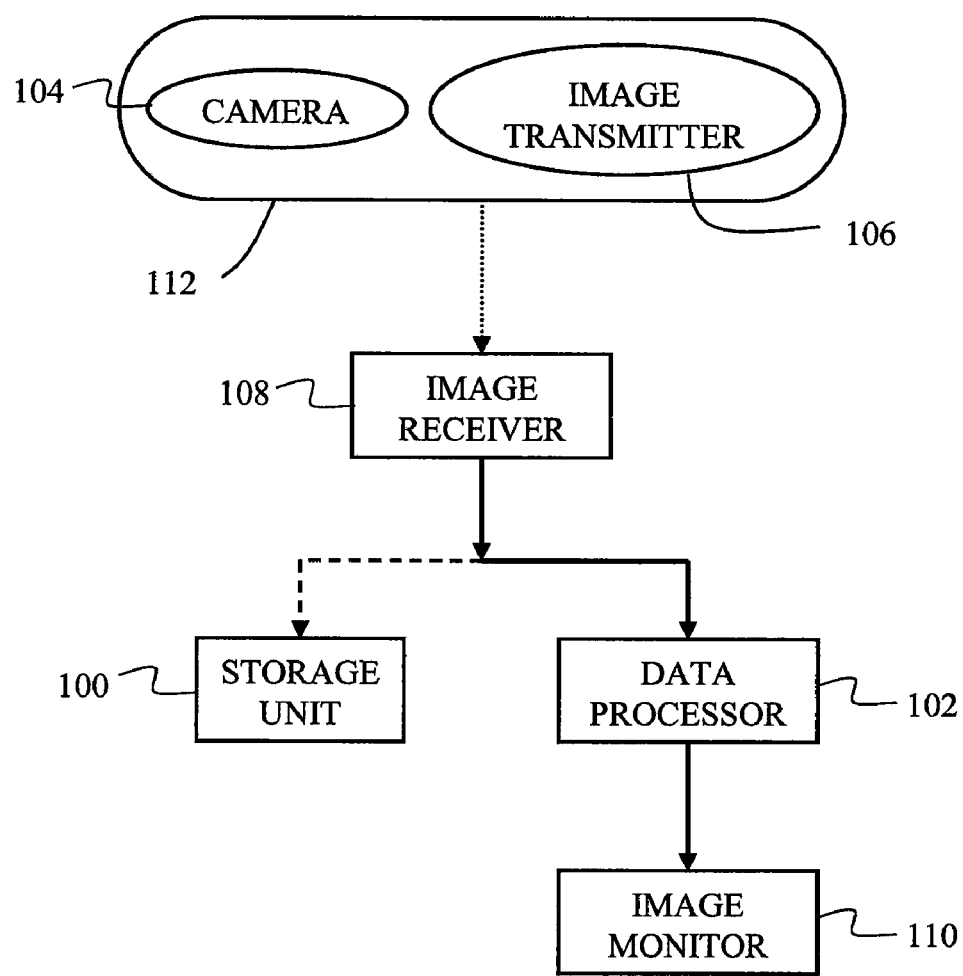
FIG. 1 (PRIOR ART) is a block diagram illustration of an in vivo camera system.
Figure 2:
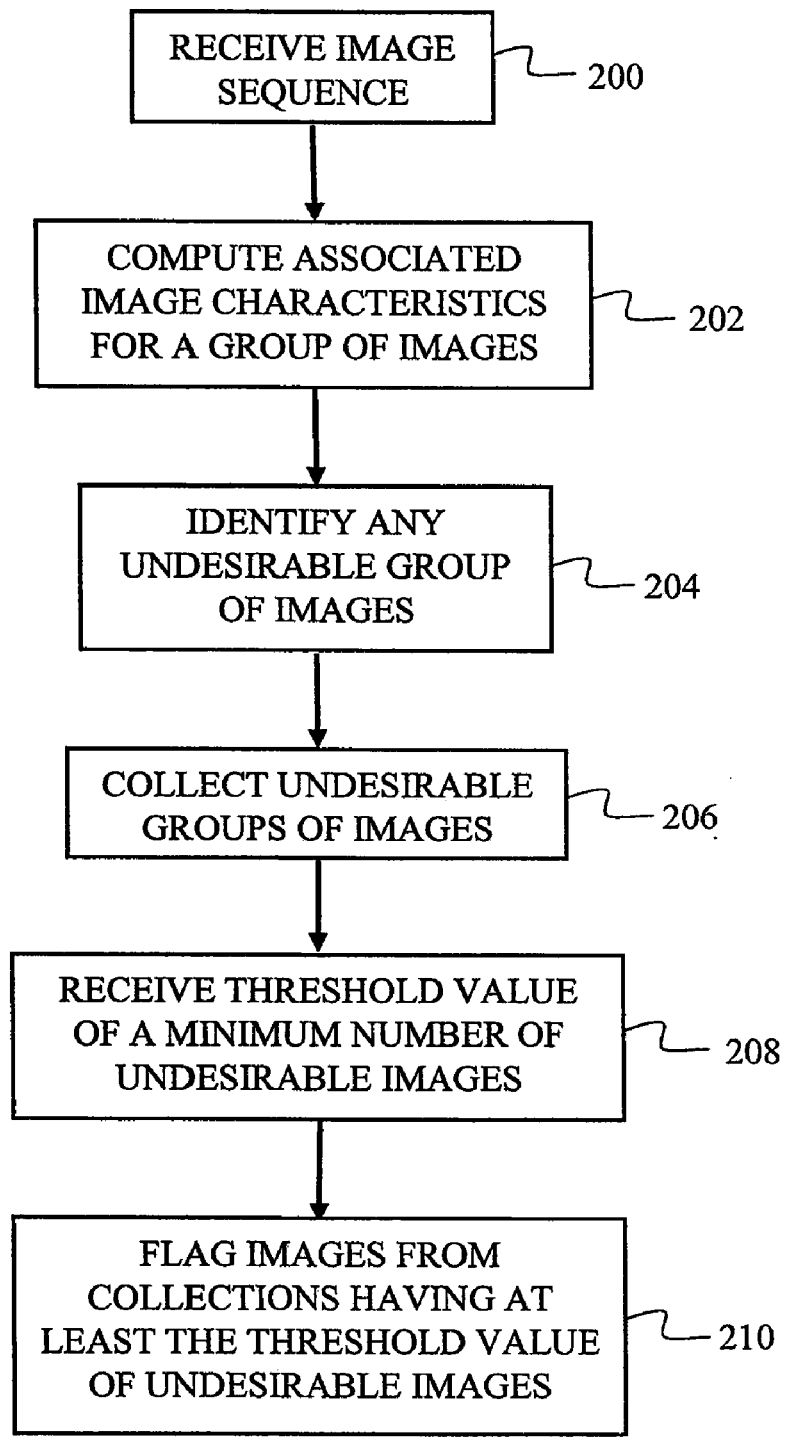
FIG. 2 is a block diagram illustration of a method of the present invention for detecting undesirable images in an image sequence.

In the following description, the present invention will be described with reference to a preferred embodiment. Referring to FIG. 2, a flowchart is shown to illustrate the method of the present invention for detecting undesirable images in an image sequence. The method comprises the following operations: receiving the image sequence 200; computing one or more associated image characteristics for a group of images 202, wherein the group of images includes at least one image from the image sequence; identifying any undesirable group of images based on the computed image characteristics 204; collecting undesirable groups of images into at least one collection 206; receiving a threshold value of a minimum number of undesirable images 208; and flagging images that belong to one or more collections that have at least the threshold value of undesirable images 210.

In operation 200 of receiving the image sequence, the image sequence comprises an ordered plurality of images or frames. The images or frames should be in digital form, as if they were captured electronically by a digital camera or other system utilizing, for example, a charge coupled device (CCD) or a complementary metal oxide semiconductor (CMOS) sensor. Alternatively, the images or frames may have originally been captured on film or tape and subsequently digitized via scanning. As long as a captured image or frame can be converted into digital form, the specific mechanism or system used for capture can be changed or modified by a person of ordinary skill in the art without departing from the scope of this invention.

In operation 202 of computing one or more associated image characteristics for a group of images, a group of images is defined to include at least one image from the image sequence. Image characteristics correspond to one or more quantities derived from pixel content of the group of images. These quantities can include, but are not limited to, sharpness, contrast, noise, exposure, and color.

Figure 3A:
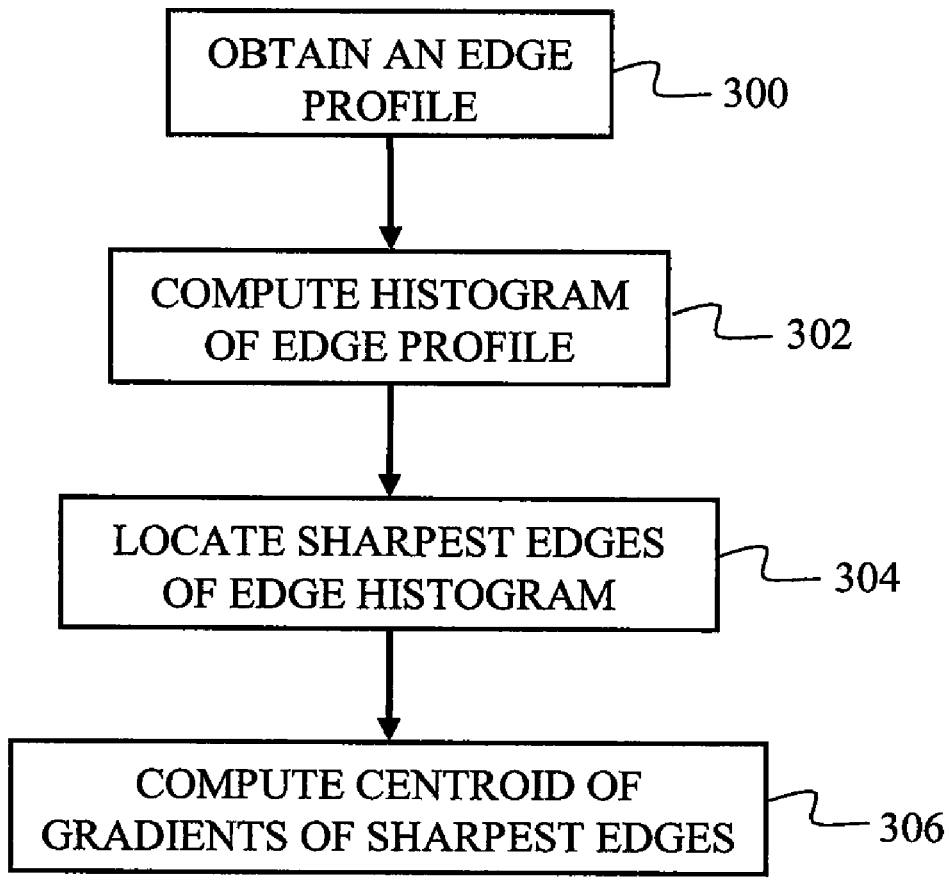
FIG. 3A (PRIOR ART) is a block diagram illustration of a method for computing the sharpness of an individual image.

The aforementioned U.S. Pat. No. 6,535,636 describes computing sharpness, contrast, noise and exposure for an individual image. Sharpness is the opposite of defocus and can be characterized by the point spread function (PSF) or the modulation transfer function (MTF) of an imaging system. One embodiment for computing sharpness is illustrated in FIG. 3A (prior art). In an initial operation 300, an edge profile of the image is obtained 300 by computing the absolute value of the Laplacian. In subsequent operation 302 a histogram of the edge profile is formed and the values that lie above the $90^{th}$ percentile represent the sharpest edges of the image. These sharpest edges of the image are located in operation 304, and then an average (centroid) of the gradients of the sharpest edges is computed in operation 306. The average gradient is the measure of sharpness. This measure of sharpness is appropriate only if the entire image is out of focus. If only part of the image is out of focus and another part is in focus, the results will be affected by the image area that is in focus.

Figure 3B:
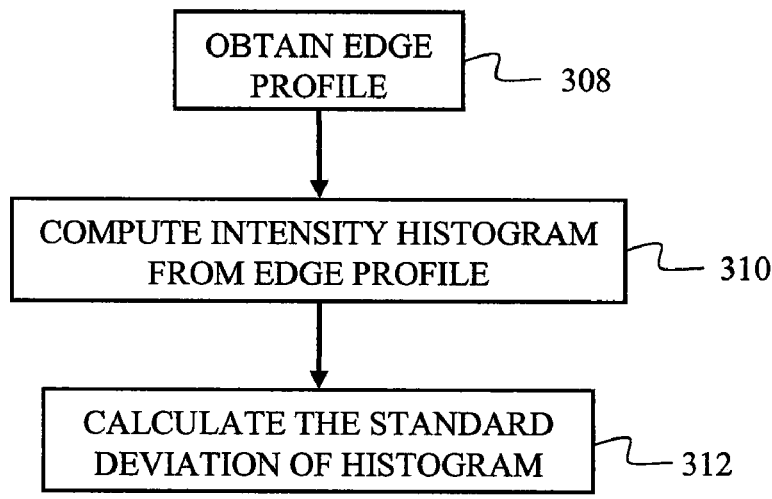
FIG. 3B (PRIOR ART) is a block diagram illustration of a method for computing the contrast of an individual image.

One way of computing the contrast of an individual image is described by Lee and Kwon in commonly assigned U.S. Pat. No. 5,822,453, issued Oct. 13, 1998, and illustrated in FIG. 3B (prior art). In an initial operation 308, the edge profile of the image is obtained by computing the absolute value of the Laplacian. An image intensity histogram from pixels on the edges of the image is computed in operation 310. The standard deviation of the histogram is computed in operation 312, thus providing the contrast measure.

Figure 3C:
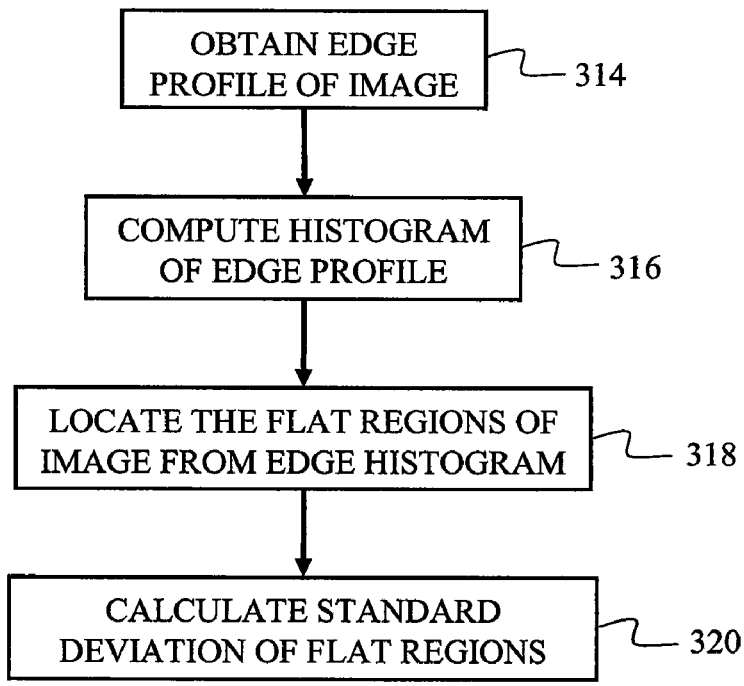
FIG. 3C (PRIOR ART) is a block diagram illustration of a method for computing the noise of an individual image.

One way of computing the noise of an individual image is described in the aforementioned U.S. Pat. No. 6,535,636 and illustrated in FIG. 3C (prior art). An edge profile of the image is obtained initially in operation 314 by computing the absolute value of the Laplacian. Subsequently, in operation 316, a histogram of the edge profile is computed and the values that lie below the $10^{th}$ percentile represent the flat regions of the image. These flat regions of the image are located 318, and then the standard deviation of the image intensity in the flat regions is computed 320. The standard deviation over the entire image is the noise measure.

Figure 3D:
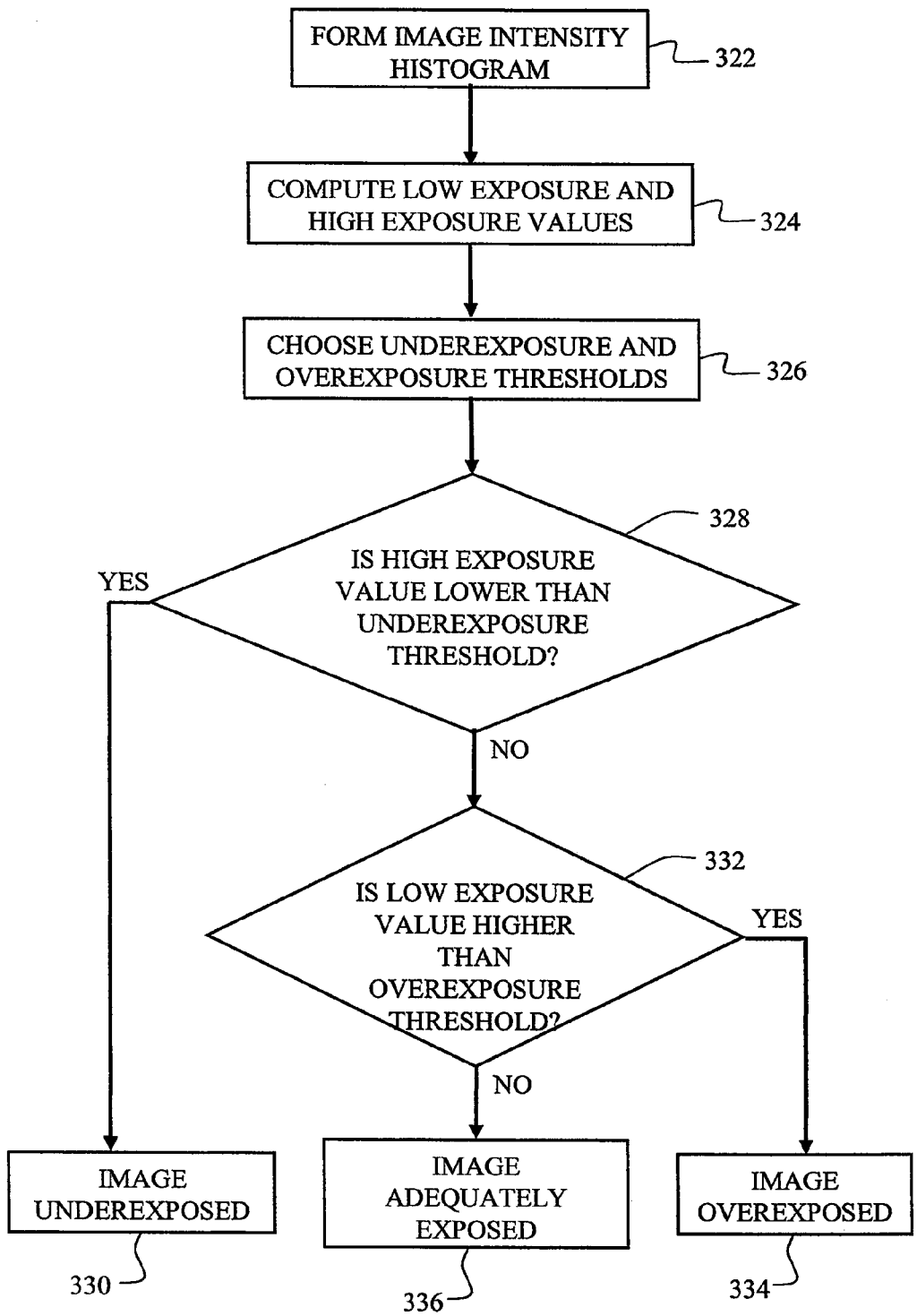
FIG. 3D is a block diagram illustration of a method for computing the exposure of an individual image.

One exemplary way of computing the exposure of an individual image is based on the description in the aforementioned U.S. Pat. No. 6,535,636 and illustrated in FIG. 3D. The overall brightness of an image is an indication of overexposure or underexposure. An image intensity histogram is formed in operation 322. Next, low exposure and high exposure values are computed in operation 324. The low exposure value is preferably the $10^{th}$ percentile of the image intensity histogram, and the high exposure value is preferably the $90^{th}$ percentile of the image intensity histogram. These low exposure and high exposure values provide a multivariate estimate of the exposure of the image. Underexposure and overexposure thresholds are chosen in operation 326 in order to determine whether the image is underexposured or overexposed. A query is made in operation 328 as to whether the high exposure value is lower than the underexposure threshold. An affirmative response to query 328 indicates that the image is classified as underexposed in operation 330. A negative response to query 328 indicates that a query is made in operation 332 as to whether the low exposure value is higher than the overexposure threshold. An affirmative response to the query in operation 332 indicates that the image is classified as overexposed in operation 334. A negative response to the query in operation 332 indicates that the image is classified as adequately exposed in operation 336.

Figure 3E:
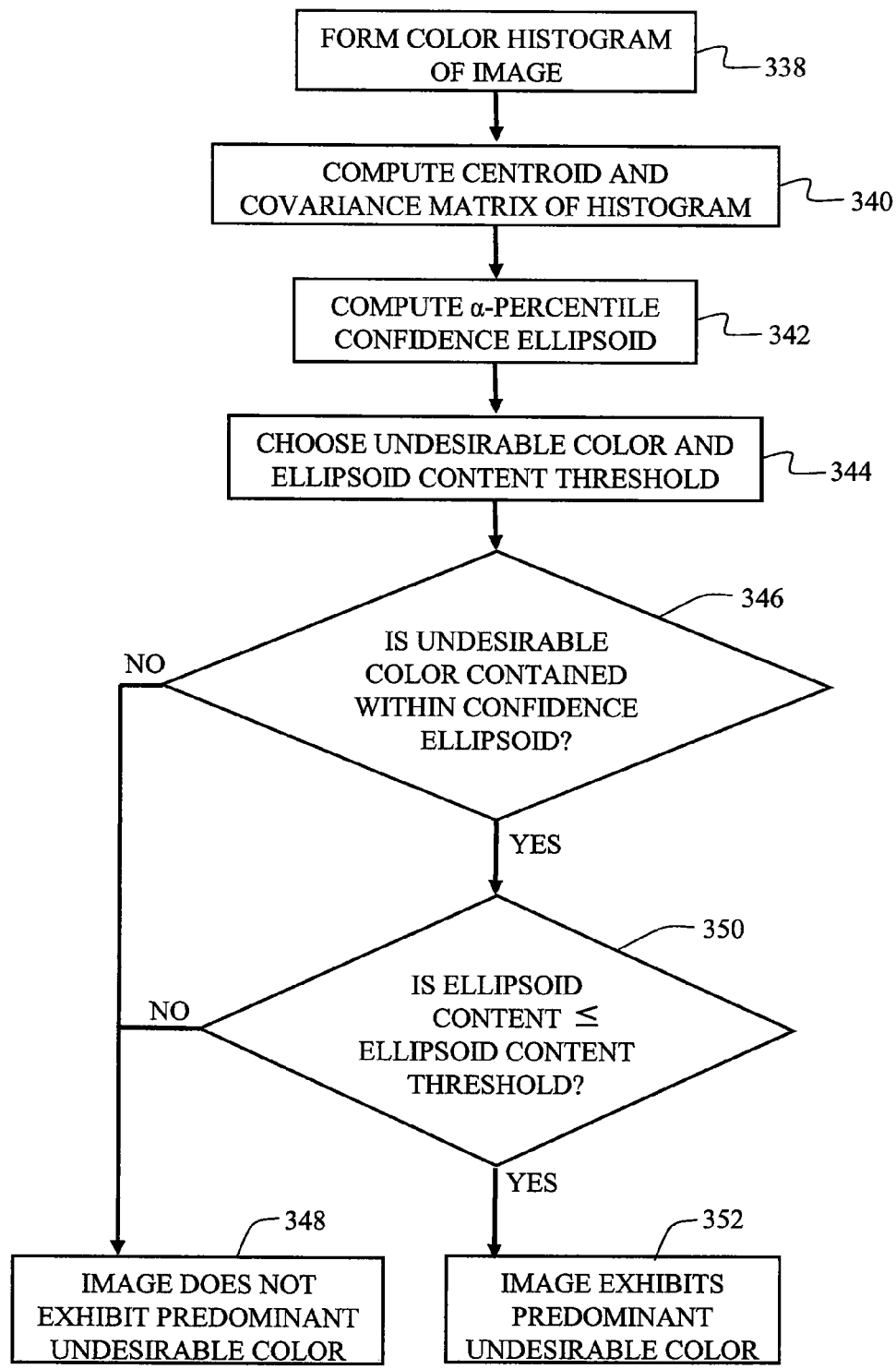
FIG. 3E is a block diagram illustration of a method for computing the color characteristics of an individual image.

An example of computing color characteristics of an individual image is based on treating the pixel values as samples from a random variable. Descriptive statistics could then be used as measures of color characteristics of the image. In an example embodiment illustrated in FIG. 3E, a first operation 338 entails forming a color histogram of the image. Next, in operation 340 the average color and dispersion (centroid and covariance matrix of the histogram) are computed. From the centroid and covariance matrix, an $\alpha$-percentile confidence ellipsoid is computed in operation 342, where $\alpha$ preferably takes on a value of 90. These computed color characteristics can be used to determine whether the image exhibits a predominant undesirable color. In order to make this determination, the undesirable color and an ellipsoid content threshold are chosen in operation 344. (Content refers to an area in two dimensions, a volume in three dimensions, and an n-dimensional volume in n dimensions.) A query is made in operation 346 as to whether the undesirable color is contained in the $\alpha$-percentile confidence ellipsoid. A negative response to the query in operation 346 indicates that the image is classified in operation 348 as not exhibiting a predominant undesirable color. An affirmative response to the query in operation 346 indicates that a query is made in operation 350 as to whether the content of the $\alpha$-percentile confidence ellipsoid is less than or equal to the ellipsoid content threshold. A negative response to the query in operation 350 indicates that the image is classified in operation 348 as not exhibiting a predominant undesirable color. An affirmative response to the query in operation 350 indicates that the image is classified in operation 352 as exhibiting a predominant undesirable color.

In computing color characteristics of an image, certain color spaces may be more desirable than others. Preferably, the color space used is independent of the particular device used to capture or display the image. This would enable the greatest degree of flexibility in practicing the current invention. However, device dependent color spaces can be used as long as the choice of undesirable color and ellipsoid content threshold are consistent with the color space chosen. In some situations, luminance information is not pertinent, and may be ignored. This can be done by transforming the color space into a space where one channel is directly related to the luminance or brightness (such as CIELAB or CIELUV) and subsequently operating on only the non-luminance channels, or by transforming into a color space in which luminance or brightness is eliminated (such as chromaticity coordinates or generalized RGB). CIELAB, CIELUV, chromaticity coordinates, and other types of color spaces are described in "The Reproduction of Color," $5^{th}$ ed., by R. W. G. Hunt, Fountain Press, 1995. Generalized RGB is a color space described in commonly assigned U.S. Pat. No. 6,690,822 (and incorporated herein by reference) that reduces the dimensionality of an RGB-based color space by projecting the 3-dimensional space onto a plane.

In general, image characteristics of an individual image are quantities that are derived from the pixel content of the image. The description of sharpness, contrast, noise, exposure, and color measures as image characteristics does not limit the scope of quantities that could be considered image characteristics; rather, it provides examples of different types of image characteristics. Other types of image characteristics can be computed, and do not differ from the spirit or scope of this invention. Furthermore, with respect to operation 202 in FIG. 2, the computed associated image characteristics may comprise one or more of the heretofore mentioned image characteristics. For example, an embodiment of the present invention may consist of an operation 202 wherein both contrast and noise measures are computed.

The heretofore mentioned techniques for computing associated image characteristics have been described in a way that is applicable to individual images. Operation 202 of the present invention includes computing associated image characteristics for a group of images, wherein a group of images is defined to include at least one image from the image sequence. Therefore, the heretofore mentioned techniques are readily applicable when the group of images is in actuality exactly one image from the image sequence. When the group of images includes at least two images from the image sequence, the image characteristics of the group of images includes a list of the image characteristics pertaining to each individual image in the group. Alternatively, the image characteristics of the group of images include aggregate measures.

Figure 4A:
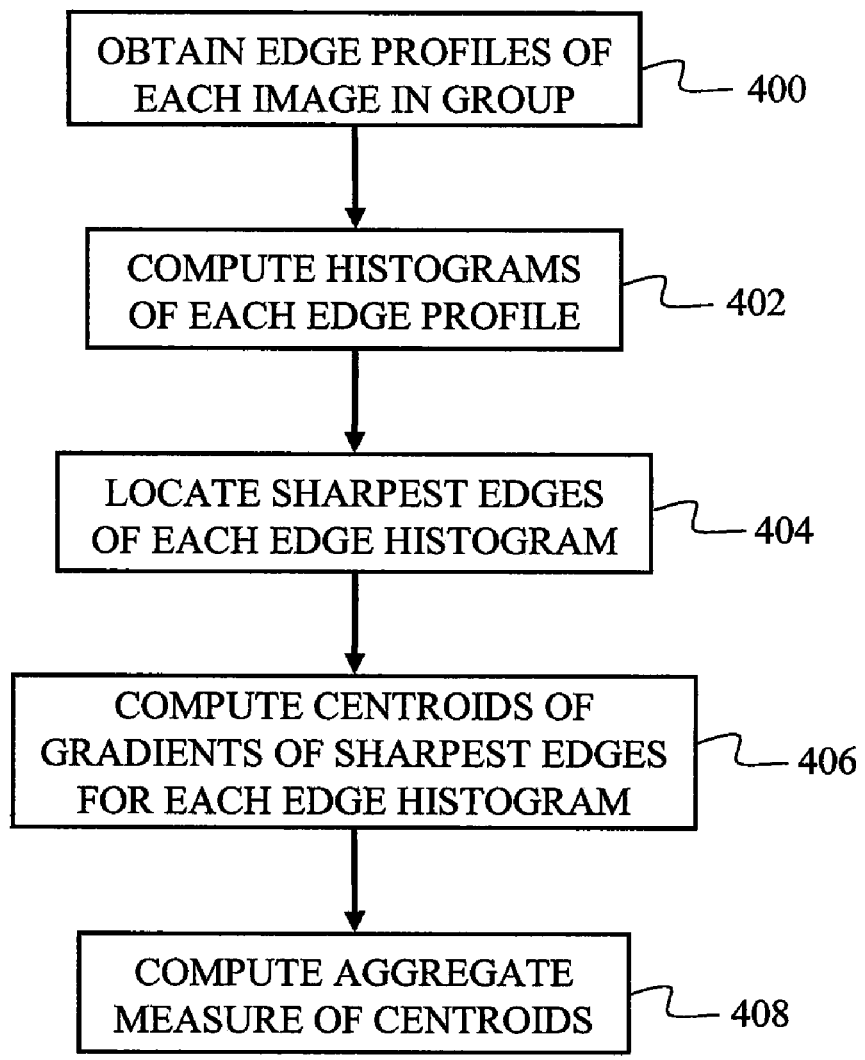
FIG. 4A is a block diagram illustration of a method for computing the sharpness of a group of images.

In one embodiment, where the group of images includes at least two images from the image sequence, the associated image characteristics for the group of images are computed by aggregating corresponding image characteristics pertaining to the individual images from the group. For example, FIG. 4A illustrates a technique for computing the sharpness of a group of at least two images. In operation 400, edge profiles of each image in the group of images are obtained by computing the absolute value of the Laplacian. Subsequently, histograms of the edge profiles are formed in operation 402, and for each image, the values that lie above the $90^{th}$ percentile of the corresponding histogram represent the sharpest edges of that image. These sharpest edges of the images are located in operation 404, and an average (centroid) of the gradients of the sharpest edges is computed in operation 406 for each image in the group. Finally, an aggregate measure of sharpness is computed in operation 408, yielding the measure of sharpness for the group of images. The aggregate measure can be the mean, trimmed mean, median, or other statistic descriptive of the set of gradient centroids. In an alternative embodiment, operations 406 and 408 can be merged, and an aggregate measure of sharpness for the group of images can be found by computing the average (centroid) of the gradients of the sharpest edges of all images in the group.

Figure 4B:
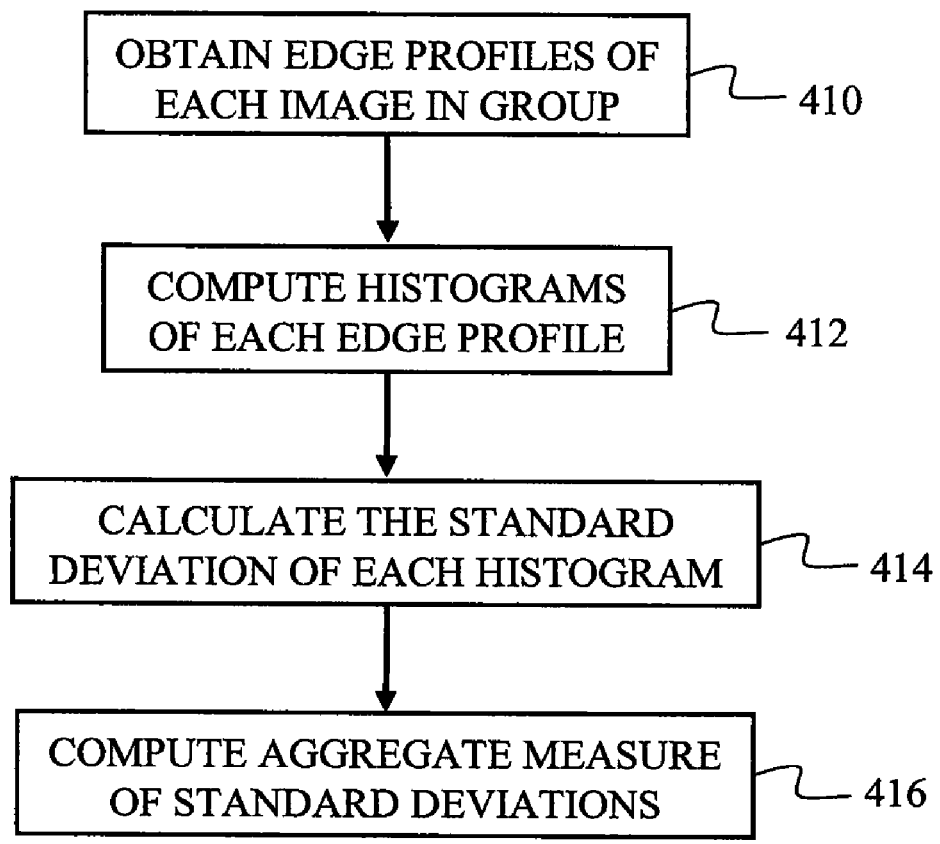
FIG. 4B is a block diagram illustration of a method for computing the contrast of a group of images.
Figure 4C:
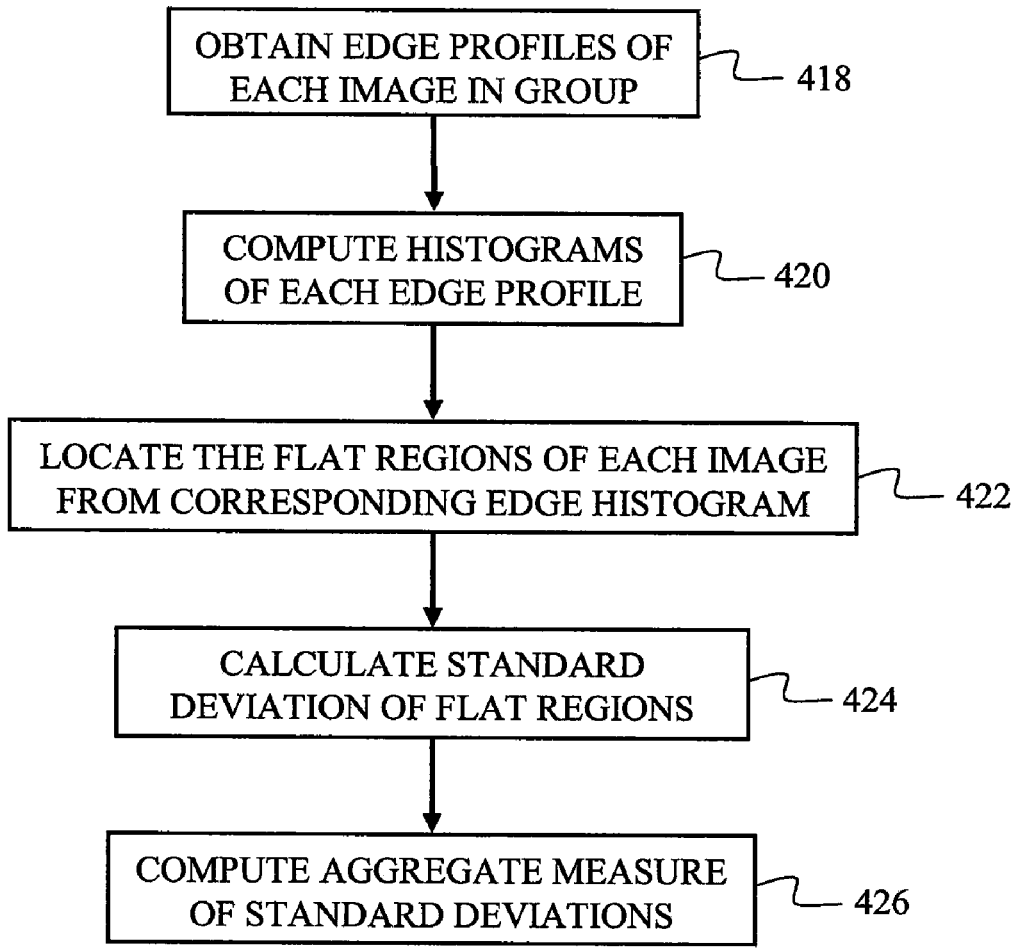
FIG. 4C is a block diagram illustration of a method for computing the noise of a group of images.

Consequently, FIGS. 4B and 4C are examples of computing associated image characteristics for the group of images by aggregating corresponding image characteristics pertaining to the individual images from the group. FIG. 4B illustrates an exemplary technique for computing the contrast of a group of at least two images. First, edge profiles of each image in the group of images are obtained in operation 410 by computing the absolute value of the Laplacian. Then, image intensity histograms from pixels on the edges of the images are formed in operation 412. The standard deviation of each histogram is computed in operation 414, and finally, an aggregate measure of contrast is computed in operation 416, yielding the measure of contrast for the group of images. The aggregate measure can be a mean, a trimmed mean, a median, or other statistic descriptive of the set of standard deviations. In an alternative embodiment, operation 412 includes forming a single intensity histogram from pixels on the edges of all of the images in the group. Operations 414 and 416 can be merged, and an aggregate measure of contrast for the group of images can be found by computing the standard deviation of the single intensity histogram.

FIG. 4C illustrates an exemplary technique for computing the noise of a group of at least two images. First, edge profiles of each image in the group of images are obtained in operation 418 by computing the absolute value of the Laplacian. Then, histograms of the edge profiles are formed in operation 420, and for each image, the values that lie below the $10^{th}$ percentile of the corresponding histogram represent the flat regions of that image. These flat regions of the images are located in operation 422, and then the standard deviation of the image intensity in the flat regions is computed in operation 424 for each image in the group. Finally, an aggregate measure of noise is computed in operation 426, yielding the measure of noise for the group of images. The aggregate measure can be the mean, trimmed mean, median, or other statistic descriptive of the set of standard deviations. In an alternative embodiment, operation 420 forms a single histogram from the edge profiles from all of the images in the group. In this case, operations 424 and 426 are merged, and an aggregate measure of contrast for the group of images are found by computing the standard deviation of the image intensity in the flat regions of all images in the group.

Figure 4D:
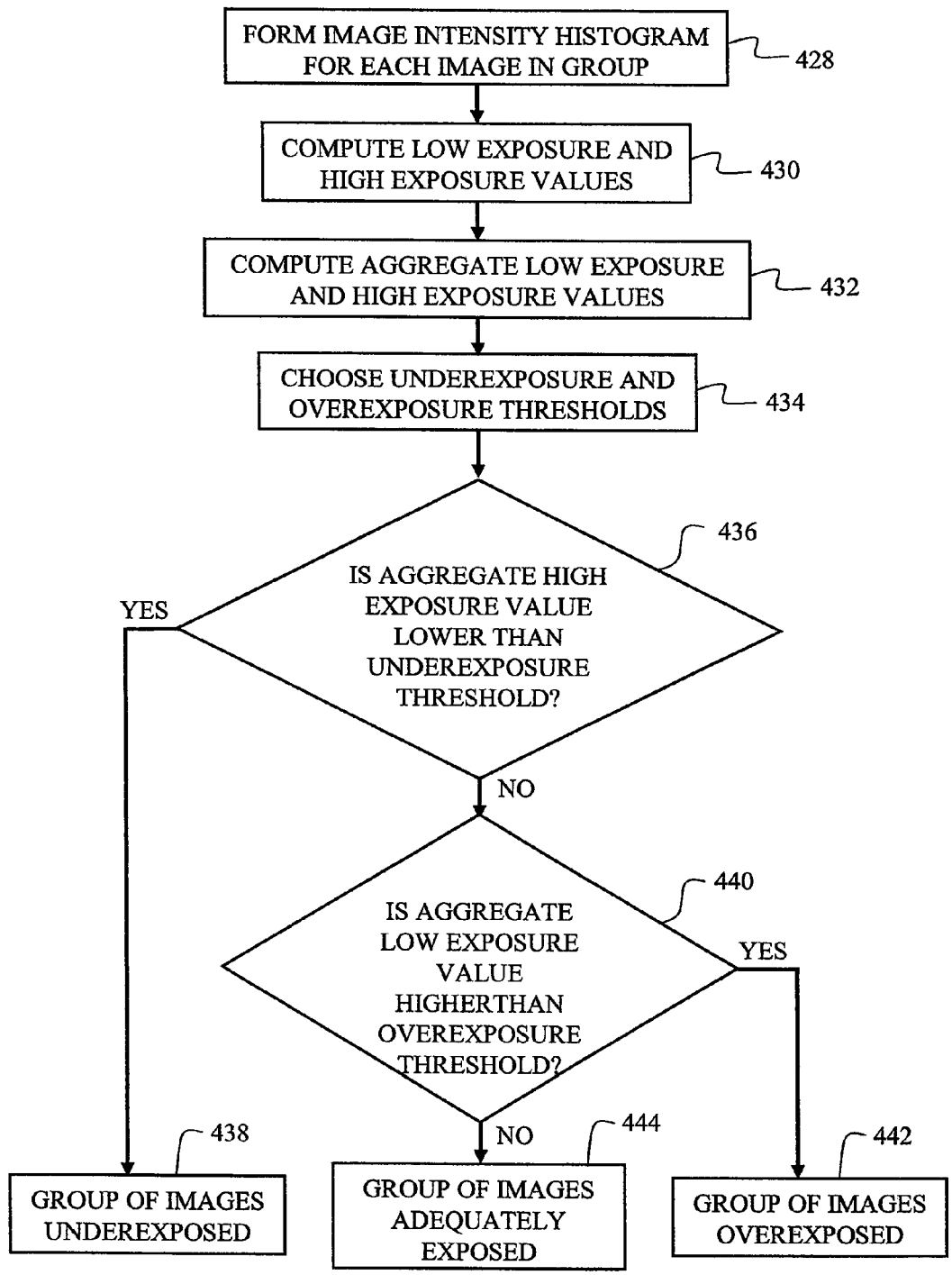
FIG. 4D is a block diagram illustration of a method for computing the exposure of a group of images.

FIG. 4D illustrates an exemplary technique for computing the exposure of a group of at least two images. In operation 428, image intensity histograms are formed for each image in the group of images. Next, in operation 430 low exposure and high exposure values are computed for each image in the group of images. The low exposure value for an image is preferably the $10^{th}$ percentile of the corresponding image intensity histogram, and the high exposure value for an image is preferably the $90^{th}$ percentile of the corresponding image intensity histogram. These low exposure and high exposure values provide a multivariate estimate of the exposure of the image. Next, an aggregate low exposure value and aggregate high exposure value are computed in operation 432, yielding a multivariate measure of exposure for the group of images. The aggregate low exposure value can be the mean, trimmed mean, median, or other statistic descriptive of the set of low exposure values, and the aggregate high exposure value can be the mean, trimmed mean, median, or other statistic descriptive of the set of high exposure values. (In an alternative embodiment, operation 428 forms a single histogram from the image intensities of all images in the group. In this case, operations 430 and 432 are merged, and aggregate low exposure and aggregate high exposure values are found by computing the percentiles from the single histogram.) Underexposure and overexposure thresholds are chosen in operation 434 in order to determine whether the group of images is underexposed or overexposed. A query is made in operation 436 as to whether the aggregate high exposure value is lower than the underexposure threshold. An affirmative response to the query in operation 436 indicates that the group of images is classified as underexposed in operation 438. A negative response to the query in operation 436 indicates that a query is made in operation 440 as to whether the aggregate low exposure value is higher than the overexposure threshold. An affirmative response to the query in operation 440 indicates that the group of images is classified as overexposed in operation 442. A negative response to the query in operation 440 indicates that the group of images is classified as adequately exposed in operation 444.

Figure 4E:
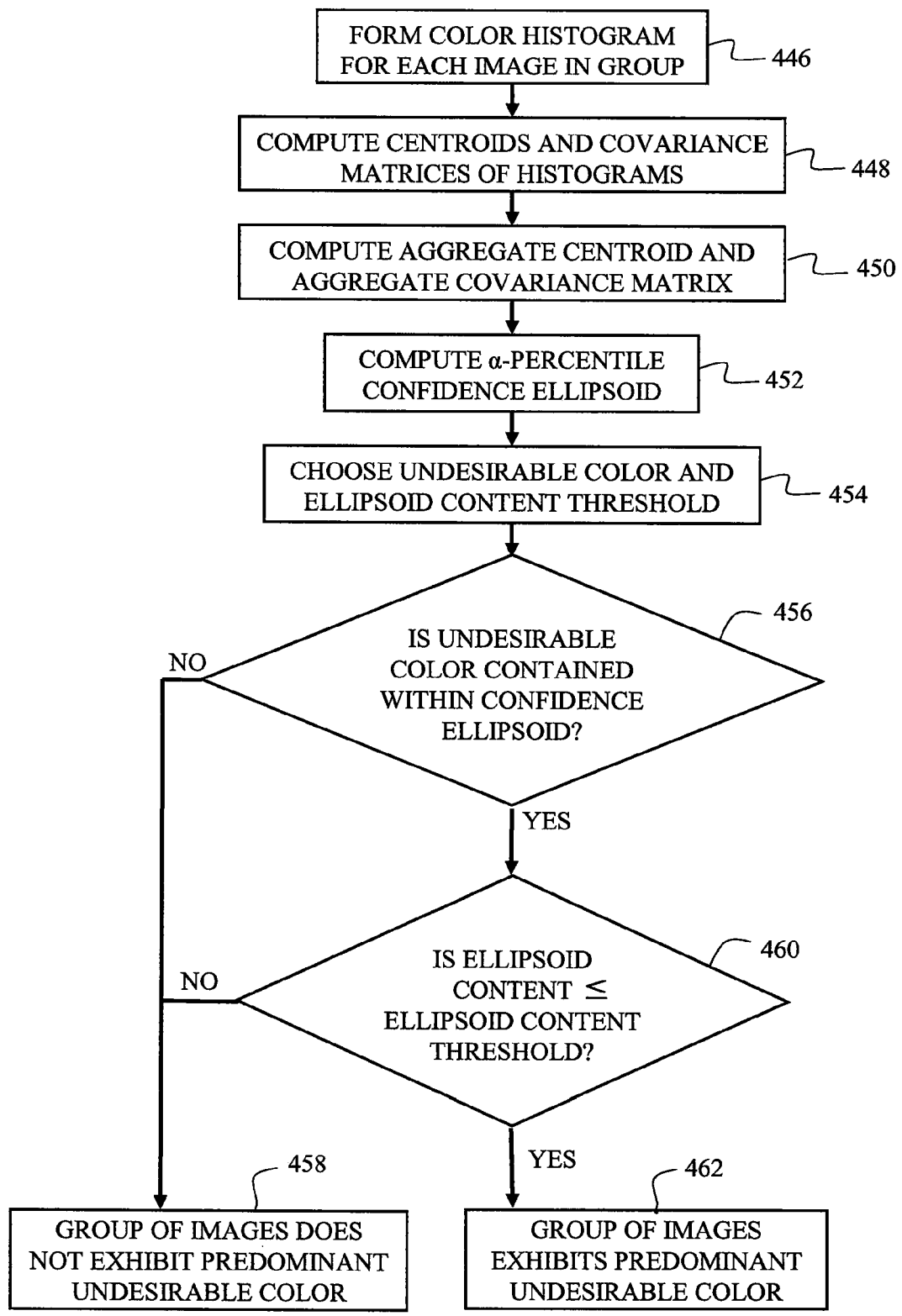
FIG. 4E is a block diagram illustration of a method for computing the color characteristics of a group of images.

FIG. 4E illustrates an exemplary technique for computing the color characteristics of a group of at least two images. Color histograms are formed in operation 446 for each image in the group of images. Next, the average color and dispersion (centroid and covariance matrix of the histogram) are computed in operation 448 for each image. An aggregate average color and aggregate dispersion (aggregate centroid and aggregate covariance matrix) are computed in operation 450, yielding a multivariate measure of the color characteristics of the group of images. (In an alternative embodiment, operation 446 forms a single color histogram from all images in the group. In this case, operations 448 and 450 are merged, and aggregate average color and aggregate dispersion are from a single color histogram.) From the aggregate centroid and aggregate covariance matrix, an $\alpha$-percentile confidence ellipsoid is computed in operation 452, where $\alpha$ preferably takes on a value of 90. These computed color characteristics are used to determine whether the group of images exhibits a predominant undesirable color. In order to make this determination, the undesirable color and an ellipsoid content threshold are chosen in operation 454. A query is made in operation 456 as to whether the undesirable color is contained in the $\alpha$-percentile confidence ellipsoid. A negative response to the query in operation 456 indicates that the group of images is classified in operation 458 as not exhibiting a predominant undesirable color. An affirmative response to the query in operation 456 indicates that a query is made in operation 460 as to whether the content of the $\alpha$-percentile confidence ellipsoid is less than or equal to the ellipsoid content threshold. A negative response to the query in operation 460 indicates that the group of images is classified in operation 458 as not exhibiting a predominant undesirable color. An affirmative response to the query in operation 460 indicates that the group of images is classified in operation 462 as exhibiting a predominant undesirable color.

In one exemplary embodiment of the present invention, associated image characteristics are computed in operation 202 (shown in FIG. 2) for a plurality of groups of images. Multiple groups of images may be overlapping (i.e., at least one image in the sequence of images is contained in at least two groups of images) or may be exclusive (i.e., no image in the sequence of images is contained in more than one group of images). Furthermore, the set of groups may be exhaustive (i.e., every image in the sequence of images is contained in at least one group of images) or incomplete (i.e., at least one image in the sequence of images is not contained in any group of images). If the set of groups is exclusive, associated image characteristics are computed for each group of images using any of the heretofore mentioned techniques. If the set of groups is overlapping, associated image characteristics can be computed for each group of images using any of the heretofore mentioned techniques; however, it can be possible to exploit the overlapping nature of the set of groups in order to achieve computational efficiency.

Figure 5:
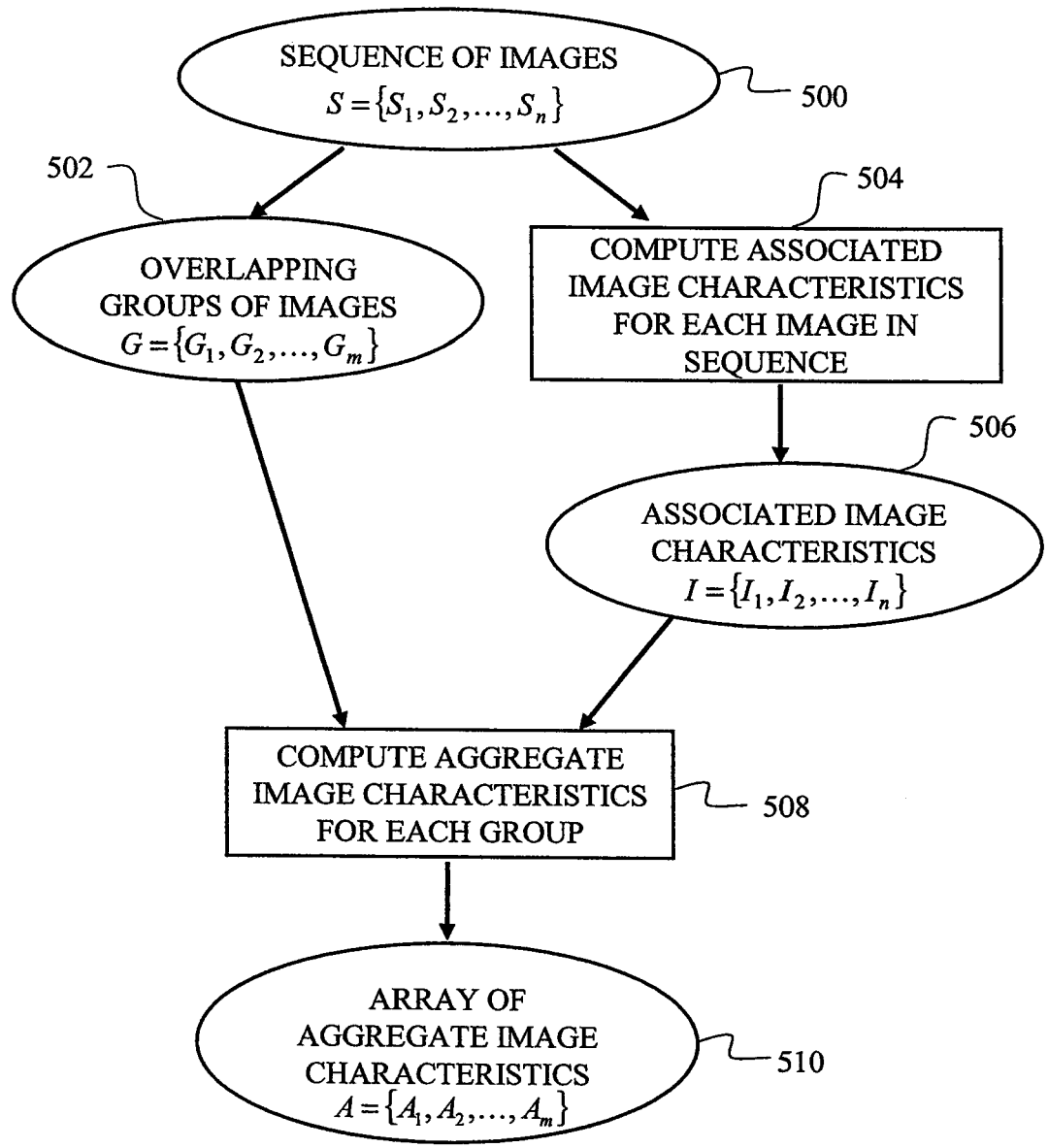
FIG. 5 is a block diagram illustration of an embodiment of the present invention.

One example that shows how to exploit the overlapping nature of the set of groups in order to achieve computational efficiency is illustrated in FIG. 5. Operation 500 provides a sequence S of n images $\{S_1, S_2, \ldots, S_n\}$. A set of overlapping groups $G=\{G_1, G_2, \ldots, G_m\}$ is formed in operation 502, where the groups each contain r images and are defined by $G_k=\{S_k, S_{k+1}, \ldots, S_{k+r-1}\}$, where $k \leq m$ and $m=n-r+1$. So, the images within a group are successive. Next, the associated image characteristics are computed in operation 504 for each image in the sequence S of images, using any of the heretofore mentioned techniques for computing an associated image characteristic for an individual image. Operation 504 yields an array $I=\{I_1, I_2, \ldots, I_n\}$ in operation 506 of associated image characteristics for each individual image in the sequence of images. Array $I=\{I_1, I_2, \ldots, I_n\}$ includes elements that may be scalar (such as sharpness, contrast, and noise measures) or multivariate (such as low exposure and high exposure values, or average color and dispersion). Finally, aggregate image characteristics are computed in operation 508 for each group of images by filtering the array I from operation 506. Operation 508 yields an array $A=\{A_1, A_2, \ldots, A_m\}$ in operation 510 of aggregate image characteristics, where each element $A_k$ corresponds to the aggregate image characteristic for a group of images. The filtering step can involve a linear filter such as an averaging filter that computes the mean of the individual image characteristics for each image in a group to form the aggregate image characteristics for each group of images. Mathematically speaking, this can be represented by the formula:

$$A_k = \frac{1}{r} \sum_{j=k}^{k+r-1} I_j, \quad (1)$$
$$k = 1, \ldots, m.$$

Alternatively, the filtering step can involve a nonlinear filter such as a trimmed mean filter, median filter, or any filter that computes a statistic descriptive of the neighborhood of individual image characteristics. Mathematically speaking, a median filter can be represented by the formula:

$$A_k = \text{median}\{I_k, I_{k+1}, \ldots, I_{k+1}, \ldots, I_{k+r-1}\}, k=1, \ldots, m. \quad (2)$$

The advantage of this embodiment is that individual image characteristics are computed once for each image in the image sequence; that is, individual image characteristics are computed on a total of n images. The alternative of computing image characteristics for each group of images independently of every other group of images is redundant; it would require that individual image characteristics are computed on a total of mr images. The value of mr is always greater than or equal to n for any valid values of m, r, and n.

In operation 204, shown in FIG. 2, of identifying any undesirable group of images based on the computed image characteristics, the identification can be performed by classification. Classification can be performed in different ways depending on whether the computed image characteristics of the group of images consist of aggregate measures, or whether the computed image characteristics of the group of images consist of a list of the image characteristics pertaining to each individual image in the group.

When the computed image characteristics of the group of images consist of aggregate measures, there are at least two alternatives for classification. One alternative, known as single feature classification, entails thresholding each aggregate measure independently to identify the undesirable groups of images based on that measure. One example of the use of a single feature classifier includes operations 434 through 444 of FIG. 4D, where thresholds are chosen to determine whether a group of images is underexposed or overexposed. Another slightly more complicated use of a single feature classifier includes operations 454 through 462 of FIG. 4E, where a threshold based on a confidence ellipsoid is chosen to determine whether a group of images exhibits a predominant undesirable color. Arguably, this example could instead be considered a multi-feature classifier, as both the average color and dispersion are utilized for classification. Other examples of the use of single feature classifiers would include choosing thresholds to determine whether the level of sharpness is undesirable, whether the level of contrast is undesirable, or whether the level of noise is undesirable.

Multi-feature classification is alternatively used when the computed image characteristics of the group of images consist of aggregate measures. This alternative classification assumes that more than one image characteristic has been computed for a group of images; for example, both sharpness and contrast together. Other image characteristics that may be selected include noise, exposure and color. A multi-feature classifier is trained to detect undesirable imagery, generally by analyzing the image characteristics of known undesirable images (and possibly of known desirable images). One example of a multi-feature classifier is a multi-feature regression technique, where the computed image characteristics are combined by a model (typically linear, but not necessarily so) in order to generate an overall image quality measure. The overall image quality measure is then thresholded against a chosen threshold. The model parameters and chosen threshold can be obtained through a training process. Other examples of multi-feature classifiers include neural networks, Bayesian classifiers, and support vector machines. For an overview of classification techniques, see "Pattern Classification," $2^{nd}$ Ed., by R. Duda, P. Hart, and D. Stork, John Wiley & Sons, 2001.

When the computed image characteristics of the group of images includes image characteristics pertaining to each individual image in the group, one possibility for classifying a group as either desirable/undesirable is to first aggregate the image characteristics pertaining to each individual image. Once this has happened, either a single-feature or multi-feature classifier can be used to determine whether a group of images is desirable or undesirable. An alternative possibility is to directly apply a multi-feature classifier without aggregating the image characteristics pertaining to each individual image. The first alternative is preferred because of its simplicity in training.

For operation 206, a collection can be thought of as a set of groups, or alternatively, as a set of images. Specifically, a collection is defined using the concept of the minimum distance between two groups. For the purposes of the present invention, minimum distance is defined to be the minimum of the absolute value of all possible differences in indices between the individual images in one group and the individual images in another group. Mathematically speaking, the minimum distance $d_{min}(G_i, G_j)$ between groups $G_i$ and $G_j$ is given by:

$$d_{min}(G_i, G_j) = \min_{p,q} |\phi(G_i^p) - \phi(G_j^q)|, \quad (3)$$

where $G_a^b$ is the $b^{th}$ image in group $G_a$, and $\phi(H)$ is the index of the image H with respect to the original sequence of images. Clearly, overlapping groups have a minimum distance of zero.

Figure 6:
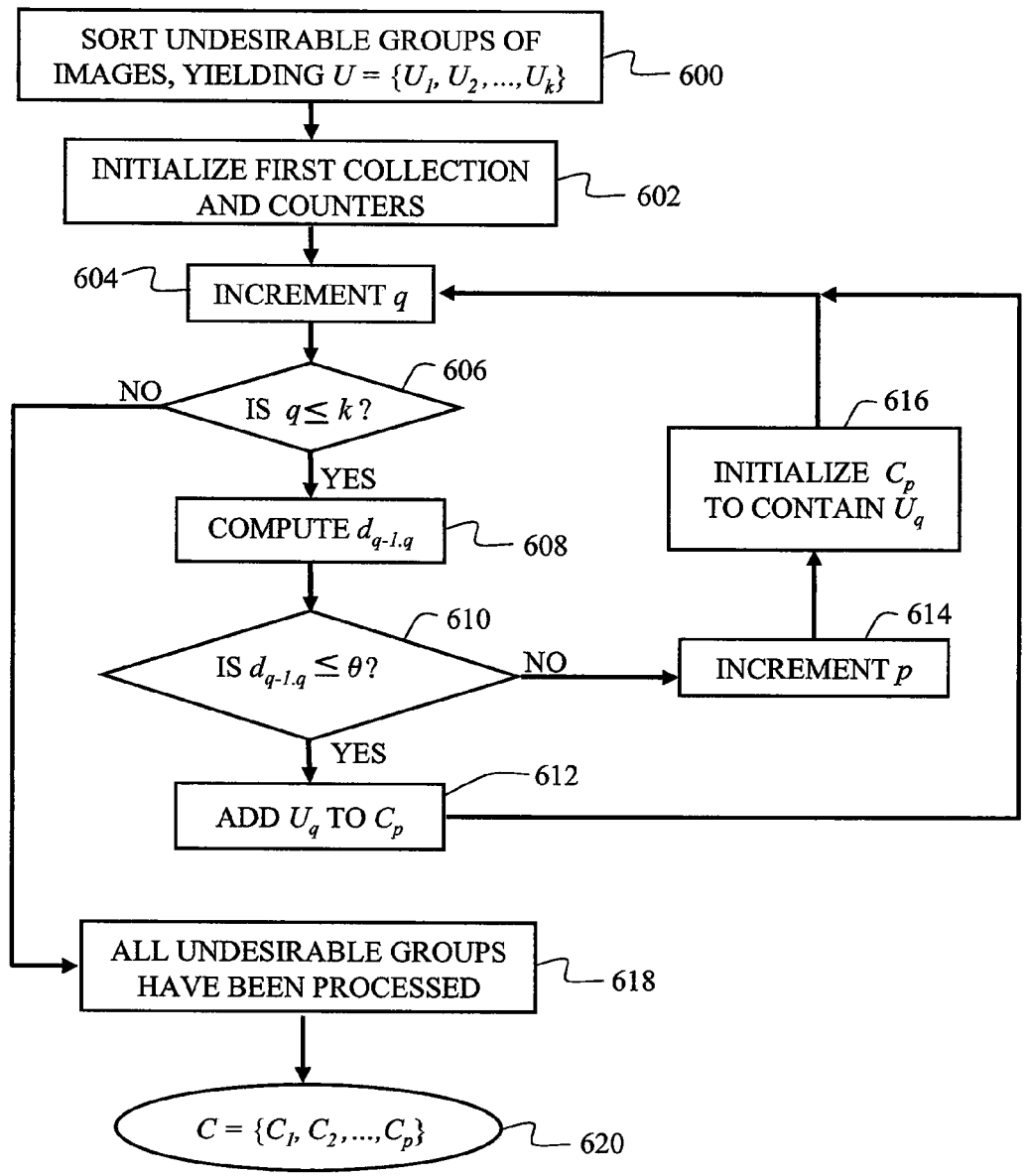
FIG. 6 is a block diagram illustration of a further embodiment of the present invention.

FIG. 6 illustrates an embodiment of operation 206 for collecting undesirable groups of images into at least one collection, using the notion of minimum distance. First, the undesirable groups of images are sorted in operation 600 so that the minimum indices of each group are arranged in increasing order. The minimum index of a group $G_i$ is given by:

$$\min_p \phi(G_i^p).$$

Once the undesirable groups of images have been sorted, the undesirable group indices are relabeled to indicate the increasing order. For the remainder of the present description, one should consider that the set of undesirable groups is given by $U=\{U_1, U_2, \ldots, U_k\}$. Next, the first collection $C_1$ is initialized in operation 602 to contain the group $U_1$. In addition, collection and group counters p and q are each initialized to one. Next, q is incremented in operation 604 by one. A query in operation 606 is made as to whether $q \leq k$. An affirmative response to the query indicates that the minimum distance $d_{q-1,q}=d_{min}(U_{q-1},U_q)$ is computed in operation 608. A query in operation 610 is made as to whether $d_{q-1,q}$ is less than or equal to the collection threshold θ. (The collection threshold can be predetermined or adaptively determined during the course of the embodiment.) An affirmative response to the query in operation 610 indicates that group $U_q$ is added in operation 612 to collection $C_p$, and the process returns to operation 604. A negative response to the query in operation 610 indicates that p is incremented in operation 614 by one, a new collection $C_p$ is initialized in operation 616 to contain the group $U_q$, and the process returns to operation 604. A negative response to the query in operation 606 indicates that all undesirable groups have been processed in operation 618, yielding a set of collections $C=\{C_1, C_2, \ldots, C_p\}$ in operation 620.

Many different embodiments can be envisioned that yield the set of collections of undesirable groups of images. Such variations and modifications can be effected by a person of ordinary skill in the art without departing from the scope of the invention.

In operation 208 for receiving a threshold value of a minimum number of undesirable images, the threshold value can be predetermined, or it can be adaptively determined based on the size of the image sequence. One example where the threshold value can be predetermined is when the sequence of images will be subsequently displayed at a given frame rate, e.g. 30 images per second, and a viewer exhibits frustration when at least three seconds of undesirable images are shown. In this example, the predetermined threshold value would be (30 images/second)*(3 seconds)=90 images. A predetermined threshold value may change based on the frame rate at which the image sequence is displayed, on based on the person viewing the image sequence. Furthermore, a predetermined threshold value may change even if the same person is viewing the image sequence at the same frame rate, for example if a person is tired and therefore more easily frustrated by shorter bursts of undesirable images.

One example where the threshold value is adaptively determined based on the size of the image sequence occurs when the viewer may be frustrated by several undesirable frames occurring nearby in a sequence. For example, consider a sequence of 10,000 images, and consider that a viewer is frustrated if there exist undesirable bursts of more than 2 percent of the length of the sequence. In this example, the adaptively determined threshold value depends on the length of the sequence, and would be (10,000 images)*(2 percent) =200 images. Another example of an adaptively determined threshold value would include situations where the image sequence is displayed at a variable frame rate, possibly controlled by the viewer.

In operation 210 for flagging images that belong to one or more collections that have at least the threshold value of undesirable images, each collection of undesirable images is considered in turn. If the number of images comprising a collection is at least the threshold value received in operation 208, then every image in the collection is flagged as undesirable. If the number of images comprising a collection is less than the threshold value received in operation 208, then none of the images in the collection are flagged as undesirable. Note that each collection includes one or more groups of images; therefore, the number of images in a collection refers to the number of images contained in the union of all groups in a collection. That is, if any groups in a collection are overlapping, then any images that are duplicated in more than one group are only counted once as belonging to the collection.

Figure 7:
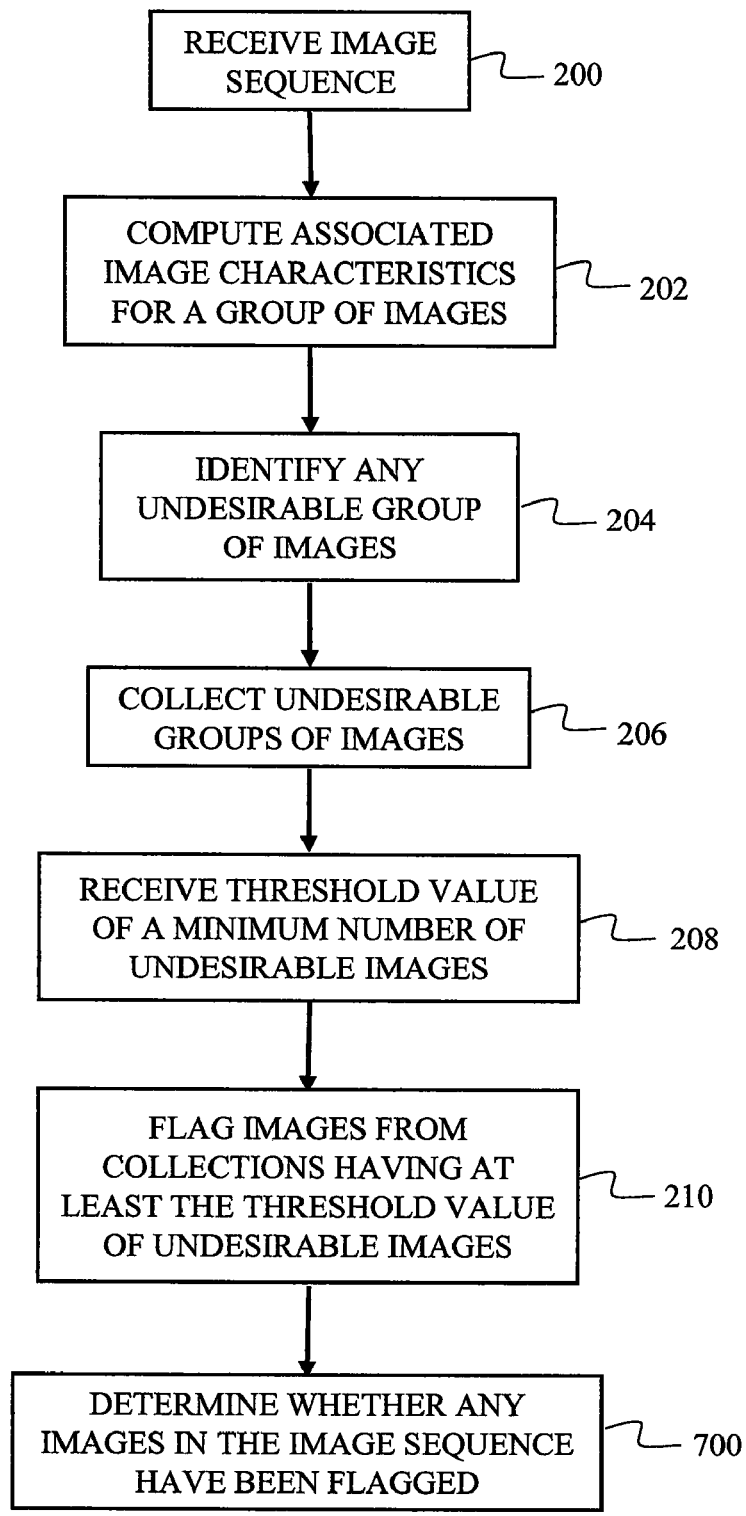
FIG. 7 is a block diagram illustration of a further method of the present invention for detecting undesirable images in an image sequence.

FIG. 7 illustrates an alternative embodiment of the present invention: a method for determining whether undesirable images exist in an image sequence. This alternative embodiment comprises several operations: receiving the image sequence in operation 200; computing associated image characteristics for a group of images in operation 202, wherein the group of images includes at least one image from the image sequence; identifying any undesirable group of images based on the computed image characteristics in operation 204; collecting undesirable groups of images into at least one collection in operation 206; receiving a threshold value of a minimum number of undesirable images in operation 208; flagging images that belong to one or more collections that have at least the threshold value of undesirable images in operation 210; and determining whether any images in the image sequence have been flagged in operation 700. This exemplary alternative embodiment carries the embodiment illustrated in FIG. 2 one step further, i.e., simply to determine whether any undesirable images are present.

Figure 8:
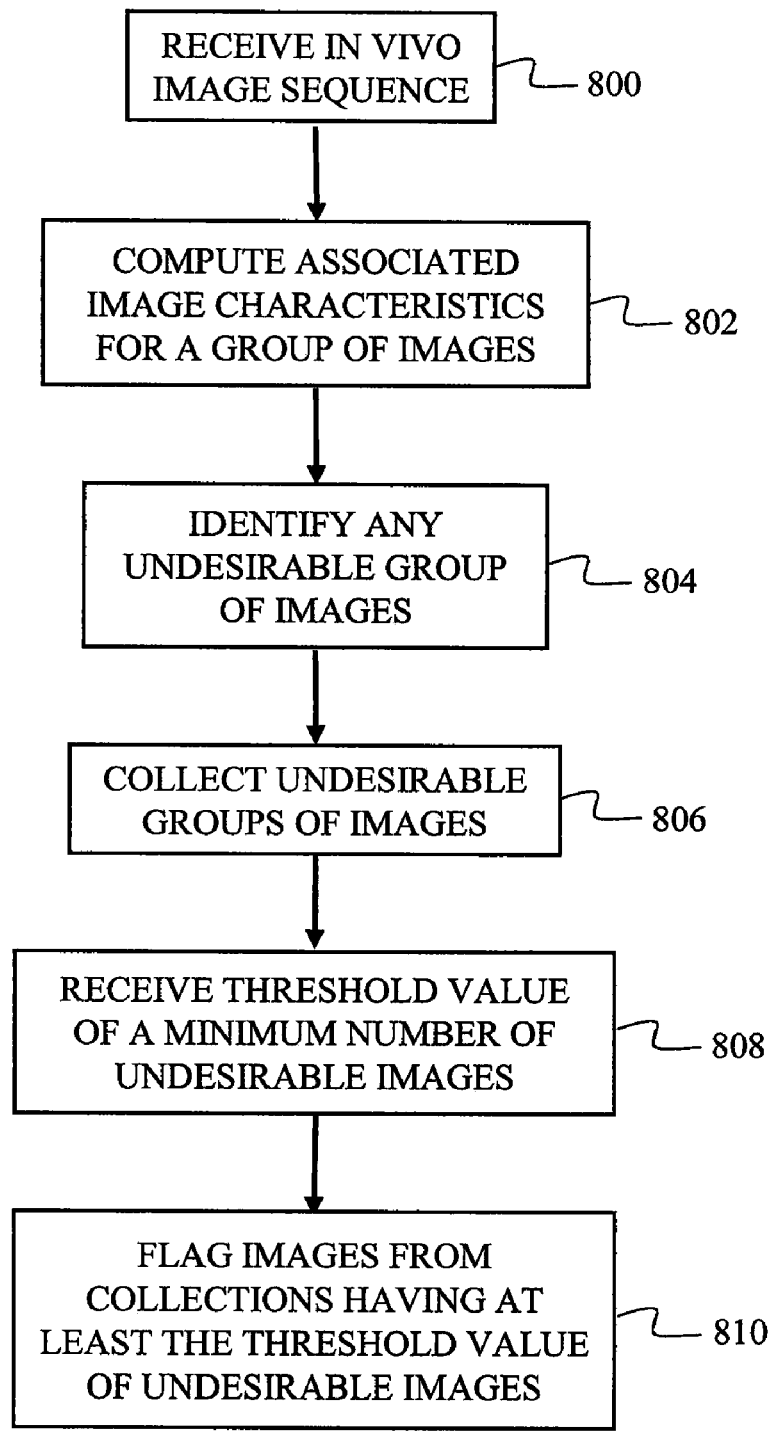
FIG. 8 is a block diagram illustration of a method of the present invention for detecting undesirable images in an in vivo image sequence.

FIG. 8 illustrates the method of the present invention for detecting undesirable images in an in vivo image sequence. The method comprises the following operations: receiving the in vivo image sequence 800; computing associated image characteristics for a group of images 802, wherein the group of images includes at least one image from the in vivo image sequence; identifying any undesirable group of images based on the computed image characteristics 804; collecting undesirable groups of images into at least one collection 806; receiving a threshold value of a minimum number of undesirable images 808; and flagging images that belong to one or more collections that have at least the threshold value of undesirable images 810.

In operation 800 of receiving the in vivo image sequence, the in vivo image sequence comprises a sequence of images captured by an in vivo camera system, for example, the system described in the aforementioned U.S. Pat. No. 5,704,531.

In operation 802 of computing associated image characteristics for a group of images, a group of images is defined to include at least one image from the in vivo image sequence. Image characteristics correspond to one or more quantities derived from pixel content of the group of images. These quantities can include, but are not limited to, sharpness, contrast, noise, exposure, and color. These image characteristics are computed by the aforementioned techniques describing FIGS. 3A, 3B, 3C, 3D, 3E, 4A, 4B, 4C, 4D and 4E. In operation 804, shown in FIG. 8, of identifying any undesirable group of images based on the computed image characteristics, said identification can be performed by classification. Classification can be performed via single feature classification (as described in the description of FIGS. 4D and 4E), or via multi-feature classification. In operation 806, a collection is defined using the minimum distance between two groups, as given by Equation (3). FIG. 6 can be described alternatively as an embodiment of operation 806 that uses the notion of minimum distance. In operation 808 for receiving a threshold value of a minimum number of undesirable images, the threshold value can be predetermined, or it can be adaptively determined based on the size of the image sequence. Examples of predetermined and adaptively determined threshold values are listed in the description of operation 208. Operation 810 is performed in the same manner as operation 210.

The general framework depicted in FIG. 2 of the present invention for detecting undesirable images in an image sequence is applicable to other types of imaging systems as well. One example is a video surveillance system that captures images under varying conditions in an unconstrained environment. Such a system may yield undesirable images similar to the ones described in the in vivo imaging system, where images may be underexposed or overexposed due to lighting conditions or darkness. In addition, undesirable images can further be defined to including images that provide little or no differential information in the temporal dimension. For example, a surveillance system recording the images of an entrance of a building in a night shift when traffic is extremely low may exhibit subsequences in which no temporally differential information is present, because most images recorded during a night shift are static and no meaningful temporally differential information can be derived. It is therefore inefficient to examine all the images that are practically unchanging during a prolonged period of time. This type of undesirable image can be detected by applying a temporal derivative operation to a group of images. If the magnitude of the temporal derivative of a group of images is less than a predetermined threshold, only one or a few images of the group need to be examined; the rest of the group can be regarded as undesirable.

Figure 9:
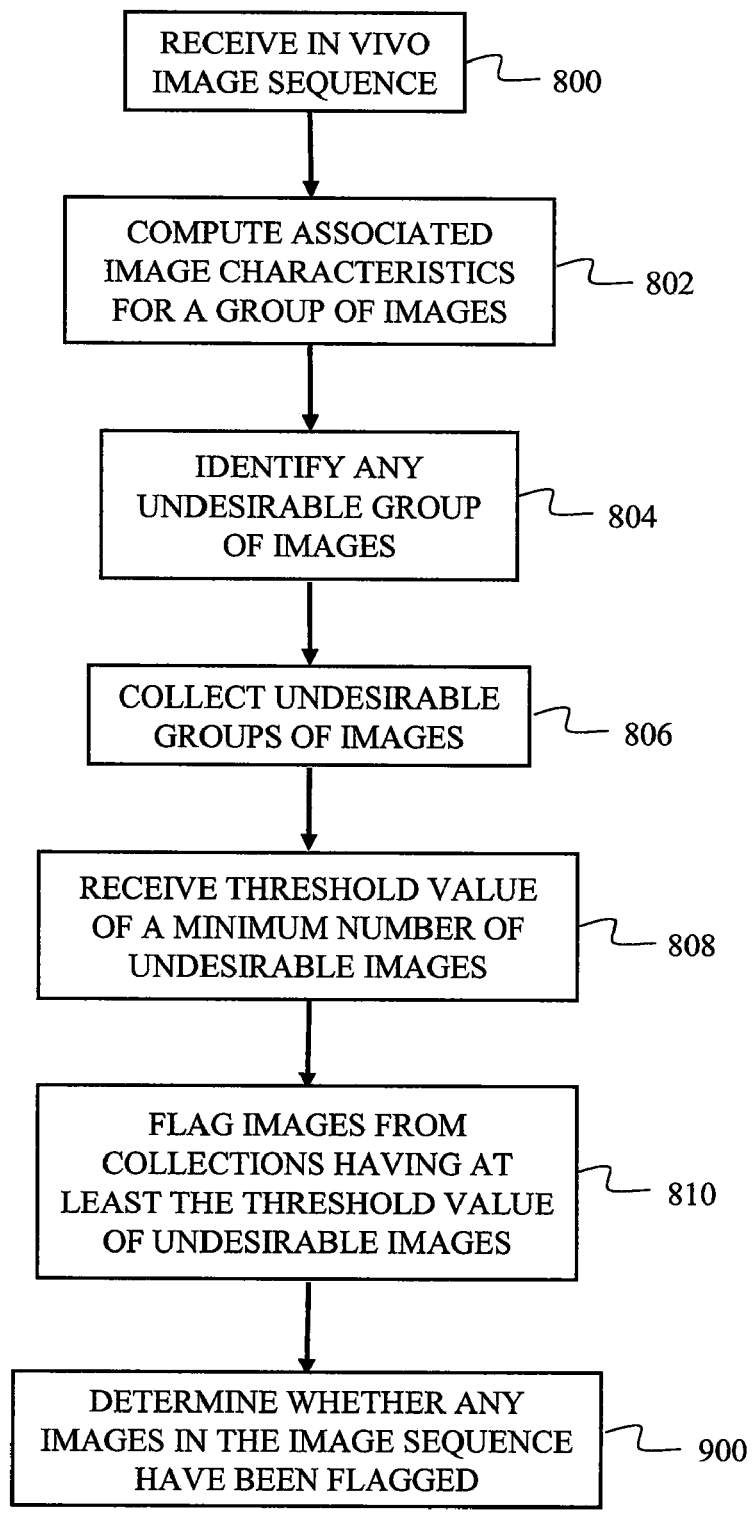
FIG. 9 is a block diagram illustration of a further method of the present invention for detecting undesirable images in an in vivo image sequence.

FIG. 9 illustrates an alternative embodiment of the present invention: a method for determining whether undesirable images exist in an image sequence. This alternative embodiment comprises several operations: receiving the in vivo image sequence in operation 800; computing associated image characteristics for a group of images in operation 802, wherein the group of images includes at least one image from the in vivo image sequence; identifying any undesirable group of images based on the computed image characteristics in operation 804; collecting undesirable groups of images into at least one collection in operation 806; receiving a threshold value of a minimum number of undesirable images in operation 808; flagging images that belong to one or more collections that have at least the threshold value of undesirable images in operation 810; and determining whether any images in the image sequence have been flagged in operation 900. This exemplary alternative embodiment carries the embodiment illustrated in FIG. 8 one step further, i.e., simply to determine whether any undesirable images are present.

Figure 10:
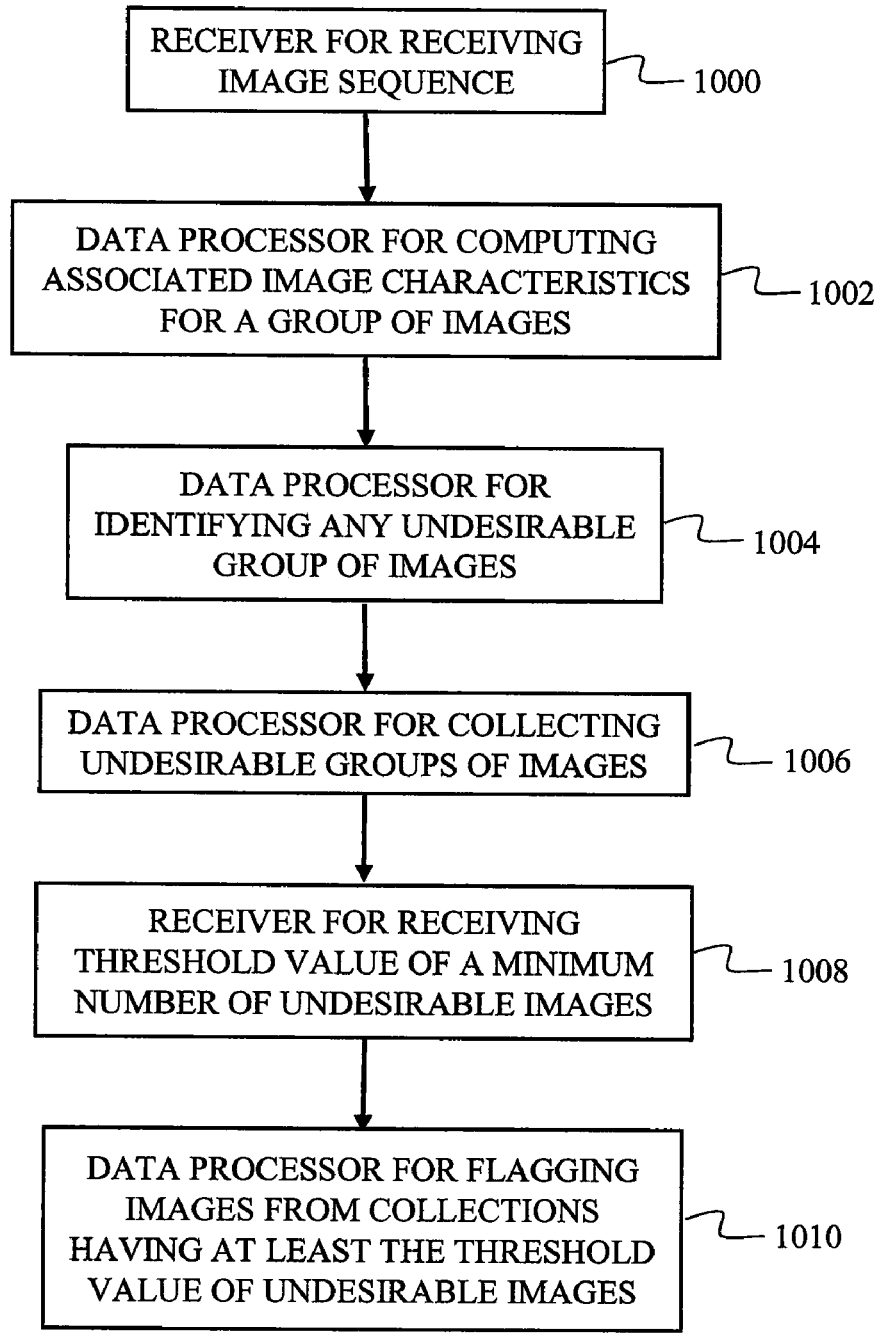
FIG. 10 is a block diagram illustration of a system of the present invention for detecting undesirable images in an image sequence; and, FIG. 11 is a block diagram illustration of a further system of the present invention for detecting undesirable images in an image sequence.

FIG. 10 contains a flowchart that illustrates an exemplary system incorporating the present invention, which detects undesirable images in an image sequence. The exemplary system comprises the following: a receiver 1000 that receives an image sequence; a data processor 1002 that computes associated image characteristics for a group of images, wherein the group of images includes at least one image from the image sequence; a data processor 1004 that identifies any undesirable group of images based on the computed image characteristics; a data processor 1006 that collects undesirable groups of images into at least one collection; a receiver 1008 that receives a threshold value of a minimum number of undesirable images; and a data processor 1010 that flags images that belong to one or more collections that have at least the threshold value of undesirable images.

Receiver 1000 receives an image sequence comparing an ordered plurality of images or frames. The images or frames should preferably be in digital form, as if they were captured electronically by a digital camera or other system utilizing, for example, a charge coupled device (CCD) or a complementary metal oxide semiconductor (CMOS) sensor. Alternatively, the images or frames may have originally been captured on film or tape and subsequently digitized via scanning. As long as a captured image or frame can be converted into digital form, the specific mechanism or system used for capture can be changed or modified by a person of ordinary skill in the art without departing from the scope of this invention.

Data processor 1002 computes associated image characteristics for a group of images, wherein a group of images is defined to include at least one image from the image sequence. Image characteristics correspond to one or more quantities derived from pixel content of the group of images. These quantities can include, but are not limited to, sharpness, contrast, noise, exposure, and color. Data processor 1002 can utilize any of the methods for computing associated image characteristics that are illustrated in FIGS. 3, 4 and 5.

Data processor 1004 identifies any undesirable group of images based on the computed image characteristics; said identification can be performed by classification. Classification can be performed in different ways depending on whether the computed image characteristics of the group of images consist of aggregate measures, or whether the computed image characteristics of the group of images consist of a list of the image characteristics pertaining to each individual image in the group. A variety of ways in which classification can be performed are described in the detailed description of operation 204 shown in FIG. 2.

Data processor 1006 collects undesirable groups of images into at least one collection, wherein a collection is defined as a set of groups, or alternatively, as a set of images, and constructed using the aforementioned minimum distance criterion. Data processor 1006 essentially performs the method of operation 206, of which an embodiment is illustrated in FIG. 6.

Receiver 1008 receives a threshold value of a minimum number of images. The threshold value can be predetermined, or it can be adaptively determined based on the size of the image sequence. One example where the threshold value can be predetermined is when the sequence of images will be subsequently displayed at a given frame rate, e.g. 30 images per second, and a viewer exhibits frustration when at least three seconds of undesirable images are shown. In this example, the predetermined threshold value would be (30 images/second)*(3 seconds)=90 images. A predetermined threshold value may change based on the frame rate at which the image sequence is displayed, or based on individual viewing habits of a person viewing the image sequence. Furthermore, a predetermined threshold value may change even if the same person is viewing the image sequence at the same frame rate; for example, when a person is tired and, therefore, more easily prone to being frustrated by shorter bursts of undesirable images.

One example where the threshold value is adaptively determined based on the size of the image sequence occurs when the viewer may be frustrated by several undesirable frames occurring nearby in a sequence. For example, consider a sequence of 10,000 images, and consider that a viewer is frustrated if there are undesirable bursts of more than 2 percent of the length of the sequence. In this example, the adaptively determined threshold value depends on the length of the sequence, and would=200 images (10,000 images)*(2 percent). Another example of an adaptively determined threshold value would include situations where the image sequence is displayed at a variable frame rate, possibly controlled by the viewer.

Data processor 1010 flags images that belong to one or more collections that have at least the threshold value of undesirable images. If the number of images comprising a collection is at least the threshold value received by receiver 1008, then every image in the collection is flagged as undesirable. If the number of images comprising a collection is less than the threshold value received by receiver 1008, then none of the images in the collection are flagged as undesirable. Note that each collection includes one or more groups of images; therefore, the number of images in a collection refers to the number of images contained in the union of all groups in a collection. That is, if any groups in a collection are overlapping, then any images that are duplicated in more than one group are only counted once as belonging to the collection.

In one embodiment of the system of the present invention, the image sequence received by receiver 1000 is an in vivo image sequence. The in vivo image sequence comprises a sequence of images captured by an in vivo camera system, for example, the system described in the aforementioned U.S. Pat. No. 5,704,531. In another embodiment, data processors 1002, 1004, 1006, 1008, and 1010 may be combined as a singular data processor or may be combined using one or more data processors networked together.

Figure 11:
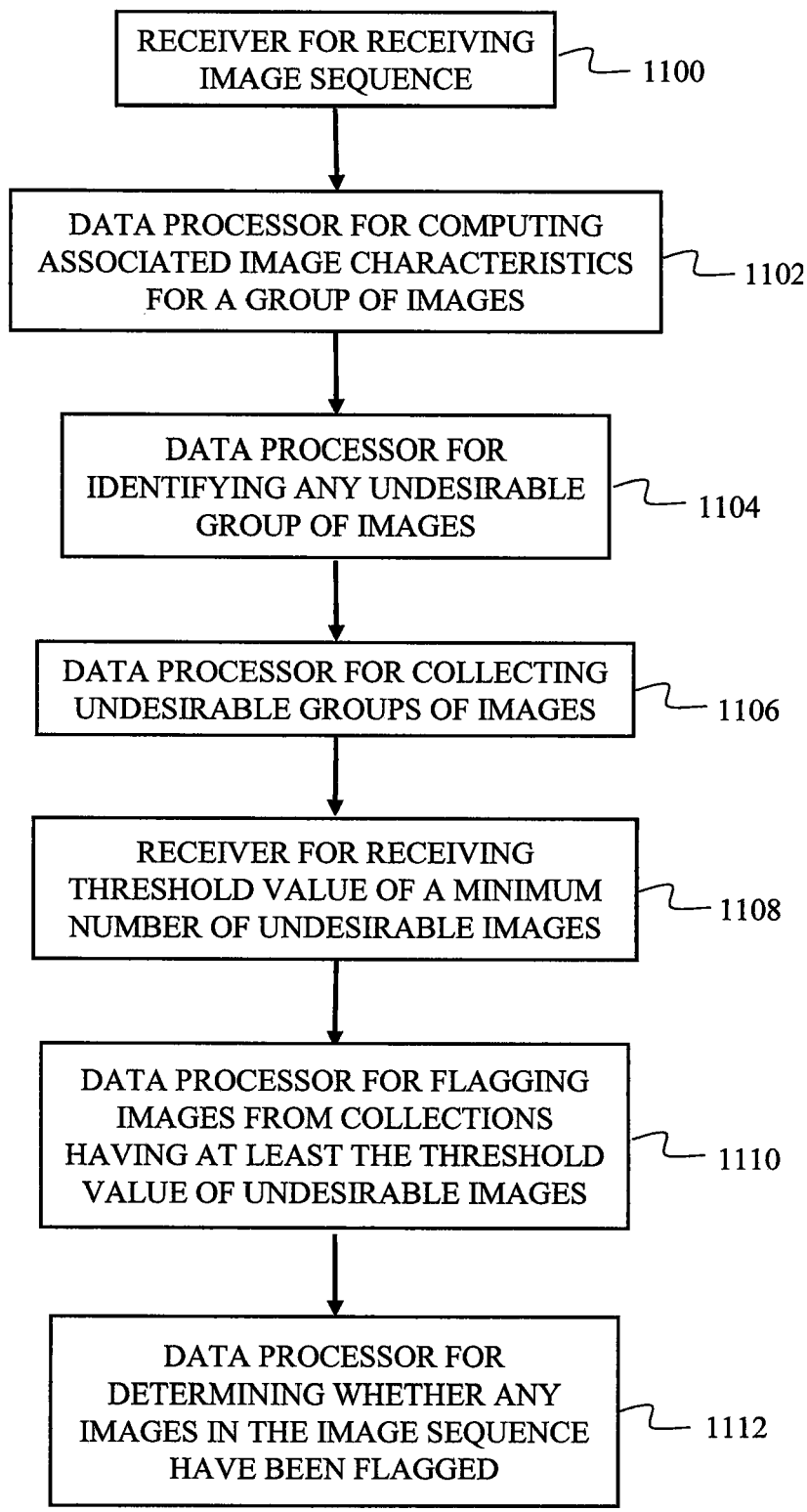

FIG. 11 illustrates an alternative system for determining whether undesirable images exist in an image sequence. This alternative system comprises: a receiver 1100 that receives an image sequence; a data processor 1102 that computes associated image characteristics for a group of images, wherein the group of images includes at least one image from the image sequence; a data processor 1104 that identifies any undesirable group of images based on the computed image characteristics; a data processor 1106 that collects undesirable groups of images into at least one collection; a receiver 1108 that receives a threshold value of a minimum number of undesirable images; a data processor 1110 that flags images that belong to one or more collections that have at least the threshold value of undesirable images; and a data processor 1112 that determines whether any undesirable images in the image sequence have been flagged. This exemplary alternative system carries the system illustrated in FIG. 10 one step further, i.e., by including a data processor 1112 to determine whether any undesirable images are present.

The invention has been described with reference to one or more preferred embodiments. However, it will be appreciated that variations and modifications can be effected by a person of ordinary skill in the art without departing from the scope of the invention.

PARTS LIST 100 storage unit
102 data processor
104 camera
106 image transmitter
108 image receiver
110 image monitor
112 capsule
200 receiving operation
202 computing operation
204 identifying operation
206 collecting operation
208 receiving operation
210 flagging operation
300 obtaining operation
302 histogram forming operation
304 locating operation
306 computing operation
308 obtaining operation
310 computing histogram operation
312 computing operation
314 obtaining operation
316 computing histogram operation
318 locate flat regions operation
320 computing operation
322 histogram forming operation
324 computing operation
326 threshold choosing operation
328 query operation
330 classification operation
332 query operation
334 classification operation
336 classification operation
338 histogram forming operation
340 computing operation
342 computing operation
344 threshold choosing operation
346 query operation
348 classification operation
350 query operation
352 classification operation
400 obtaining operation
402 histogram forming operation
404 locating operation
406 computing operation
408 computing operation
410 obtaining operation
412 histogram forming operation
414 computing operation
416 computing operation
418 obtaining operation
420 histogram forming operation
422 locating operation
424 computing operation
426 computing operation
428 histogram forming operation
430 computing operation
432 computing operation
434 threshold choosing operation
436 query operation
438 classification operation
440 query operation 442 classification operation
444 classification operation
446 histogram forming operation
448 computing operation
450 computing operation
452 computing operation
454 threshold choosing operation
456 query operation
458 classification operation
460 query operation
462 classification operation
500 providing operation
502 forming operation
504 computing operation
506 array operation
508 computing operation
510 array operation
600 sorting operation
602 initializing operation
604 incrementing operation
606 query operation
608 computing operation
610 query operation
612 adding operation
614 incrementing operation
616 initializing operation
618 groups processed operation
620 set of collections operation
700 determining operation
800 receiving operation
802 computing operation
804 identifying operation
806 collecting operation
808 receiving operation
810 flagging operation
900 determining operation
1000 receiver
1002 data processor
1004 data processor
1006 data processor
1008 receiver
1010 data processor
1100 receiver
1102 data processor
1104 data processor
1106 data processor
1108 receiver
1110 data processor
1112 data processor

What is claimed is:

1. A method for detecting undesirable images within an image sequence, comprising using a data processor to perform the steps of:
receiving the image sequence;
computing one or more associated image characteristics for at least one group of images selected from the image sequence, wherein the at least one group of images includes at least one image from the image sequence;
identifying any undesirable group or groups of images within the image sequence based on the computed associated image characteristics;
collecting undesirable groups of images into at least one collection;
receiving a determined threshold value of a minimum number of undesirable images within a collection of undesirable groups of images; and
flagging as undesirable only images that belong to the at least one collection that has at least the determined threshold value of a minimum number of undesirable images.

2. The method claimed in claim 1, further comprising the step of:
determining whether any images within the image sequence have been flagged.

3. The method claimed in claim 1, wherein the threshold value is predetermined.

4. The method claimed in claim 1, wherein the threshold value is adaptively determined based on the size of the image sequence.

5. The method claimed in claim 1, wherein the image characteristics correspond to one or more quantities derived from pixel content of the at least one group of images.

6. The method claimed in claim 5, wherein the image characteristics are selected from a list of image characteristics including sharpness, contrast, noise, exposure, color.

7. A method for detecting undesirable images within an in vivo image sequence, comprising using a data processor to perform the steps of:
receiving the in vivo image sequence;
computing one or more associated image characteristics for at least one group of images selected from the in vivo image sequence, wherein the at least one group of images includes at least one image from the in vivo image sequence;
identifying any undesirable group or groups of images within the in vivo image sequence based on the computed image characteristics;
collecting undesirable groups of images into at least one collection;
receiving a determined threshold value of a minimum number of undesirable images within a collection of undesirable groups of images; and
flagging as undesirable only images that belong to the at least one collection that has at least the determined threshold value of a minimum number of undesirable images.

8. The method claimed in claim 7, further comprising the step of:
determining whether any images within the in vivo image sequence have been flagged.

9. The method claimed in claim 7, wherein the threshold value is predetermined.

10. The method claimed in claim 7, wherein the threshold value is adaptively determined based on the size of the in vivo image sequence.

11. The method claimed in claim 7, wherein the image characteristics correspond to one or more quantities derived from pixel content of the at least one group of images.

12. The method claimed in claim 11, wherein the image characteristics are selected from a list of image characteristics including sharpness, contrast, noise, exposure, color.

13. A system for detecting undesirable images within an image sequence, comprising:
a receiver that receives the image sequence;
a data processor that computes one or more associated image characteristics for at least one group of images selected from the image sequence, wherein the at least one group of images includes at least one image from the image sequence;
a data processor that identifies any undesirable group of images within the image sequence based on the computed image characteristics;

a data processor that collects undesirable groups of images into at least one collection;

a receiver that receives a determined threshold value of a minimum number of undesirable images within a collection of undesirable groups of images; and a data processor that flags as undesirable only images that belong to the at least one collection that has at least the determined threshold value of a minimum number of undesirable images.

14. The system claimed in claim 13, further comprising:

a data processor that determines whether any images within the image sequence have been flagged.

15. The system claimed in claim 13, wherein the threshold value is predetermined.

16. The system claimed in claim 13, wherein the threshold value is adaptively determined based on the size of the image sequence.

17. The system claimed in claim 13, wherein the image characteristics correspond to one or more quantities derived from pixel content of the at least one group of images.

18. The system claimed in claim 17, wherein the image characteristics are selected from a list of image characteristics including sharpness, contrast, noise, exposure, and color.

19. The system claimed in claim 13, wherein the image sequence comprises an in vivo image sequence.

20. The system claimed in claim 13, wherein one or more of the data processors are combined together as a singular data processor.

* * * * *